(12) United States Patent
Dufendach et al.

(10) Patent No.: US 11,358,466 B2
(45) Date of Patent: Jun. 14, 2022

(54) CAPLESS CLOSURE FOR FUEL FILLER PIPE

(71) Applicant: Stant USA Corp., Connersville, IN (US)

(72) Inventors: Darl Dufendach, Connersville, IN (US); Paul Wetzel, Oxford, OH (US); Jan Nimrichter, Karvina (CZ)

(73) Assignee: Stant USA Corp., Connersville, IN (US)

( * ) Notice: Subject to any disclaimer, the term of this patent is extended or adjusted under 35 U.S.C. 154(b) by 70 days.

(21) Appl. No.: 16/888,031

(22) Filed: May 29, 2020

(65) Prior Publication Data

US 2020/0376956 A1 Dec. 3, 2020

Related U.S. Application Data

(60) Provisional application No. 62/855,522, filed on May 31, 2019.

(51) Int. Cl.
*B60K 15/05* (2006.01)
*B60K 15/04* (2006.01)

(52) U.S. Cl.
CPC .......... *B60K 15/05* (2013.01); *B60K 15/0406* (2013.01); *B60K 2015/0429* (2013.01)

(58) Field of Classification Search
CPC .... B60K 15/05; B60K 15/04; B60K 15/0406; B60K 2015/0429
USPC ...................................... 296/97.22
See application file for complete search history.

(56) References Cited

U.S. PATENT DOCUMENTS

| | | | | |
|---|---|---|---|---|
| 6,325,233 B1* | 12/2001 | Harris | ............... | B60K 15/0406 220/288 |
| 6,446,826 B1* | 9/2002 | Foltz | ..................... | B60K 15/04 220/203.01 |
| 6,508,374 B1* | 1/2003 | Griffin | ............... | B60K 15/0406 220/288 |
| 7,163,117 B2* | 1/2007 | Griffin | ............... | B60K 15/0406 220/303 |
| 2007/0000574 A1* | 1/2007 | DeCapua | ............... | B60K 15/04 141/350 |
| 2017/0297426 A1* | 10/2017 | Sperando | ............ | B29C 45/7207 |
| 2018/0222314 A1 | 8/2018 | Sakai | | |

FOREIGN PATENT DOCUMENTS

| | | |
|---|---|---|
| CN | 211416955 | 9/2020 |
| JP | 5321444 | 10/2013 |
| KR | 101028669 | 4/2011 |

OTHER PUBLICATIONS

International Search Report for PCT/US2020/035296 dated Sep. 11, 2020 (form PCT/ISA/220—3 pages).
Written Opinion of International Searching Authority for PCT/US2020/035296 dated Sep. 11, 2020 (Form PCT/ISA/220—8 pages).

* cited by examiner

*Primary Examiner* — Mahmoud Gimie
(74) *Attorney, Agent, or Firm* — Barnes & Thornburg LLP

(57) ABSTRACT

A capless filler pipe closure is provided for a tank filler pipe. The capless closure permits a fuel pump nozzle to be inserted into the tank filler pipe without first removing a fuel cap from the outer end of the tank filler pipe.

46 Claims, 10 Drawing Sheets

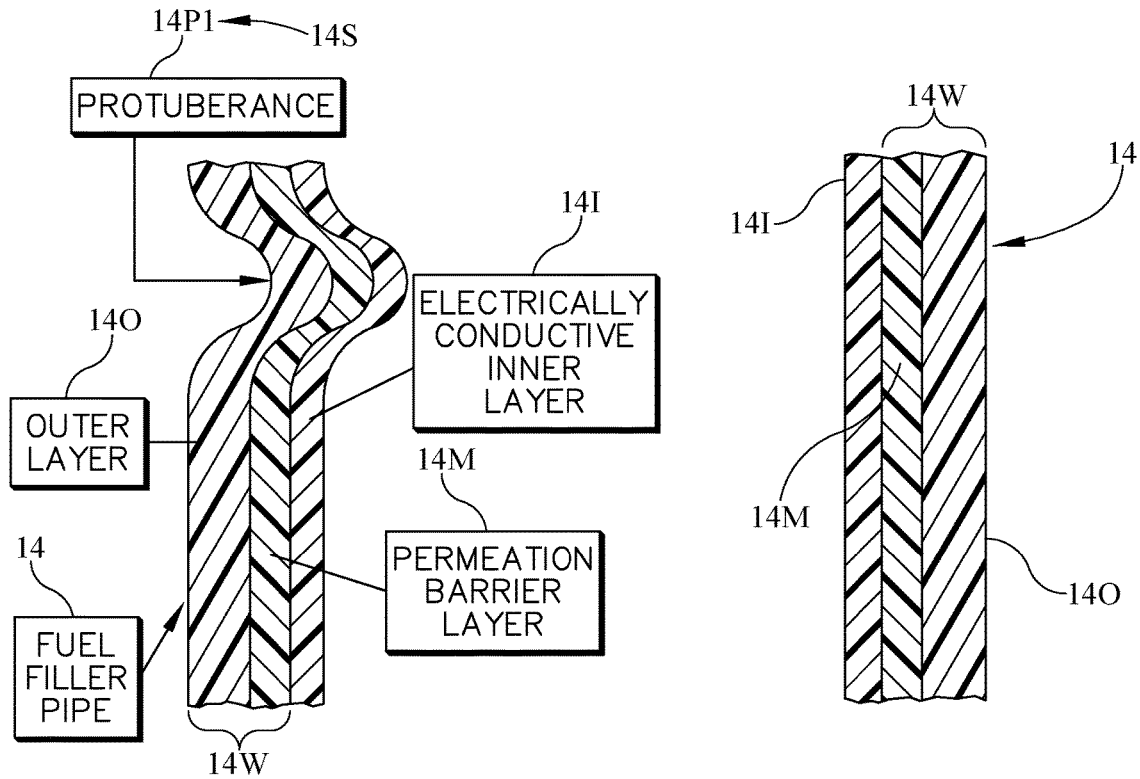
FIG. 4A
FIG. 4B
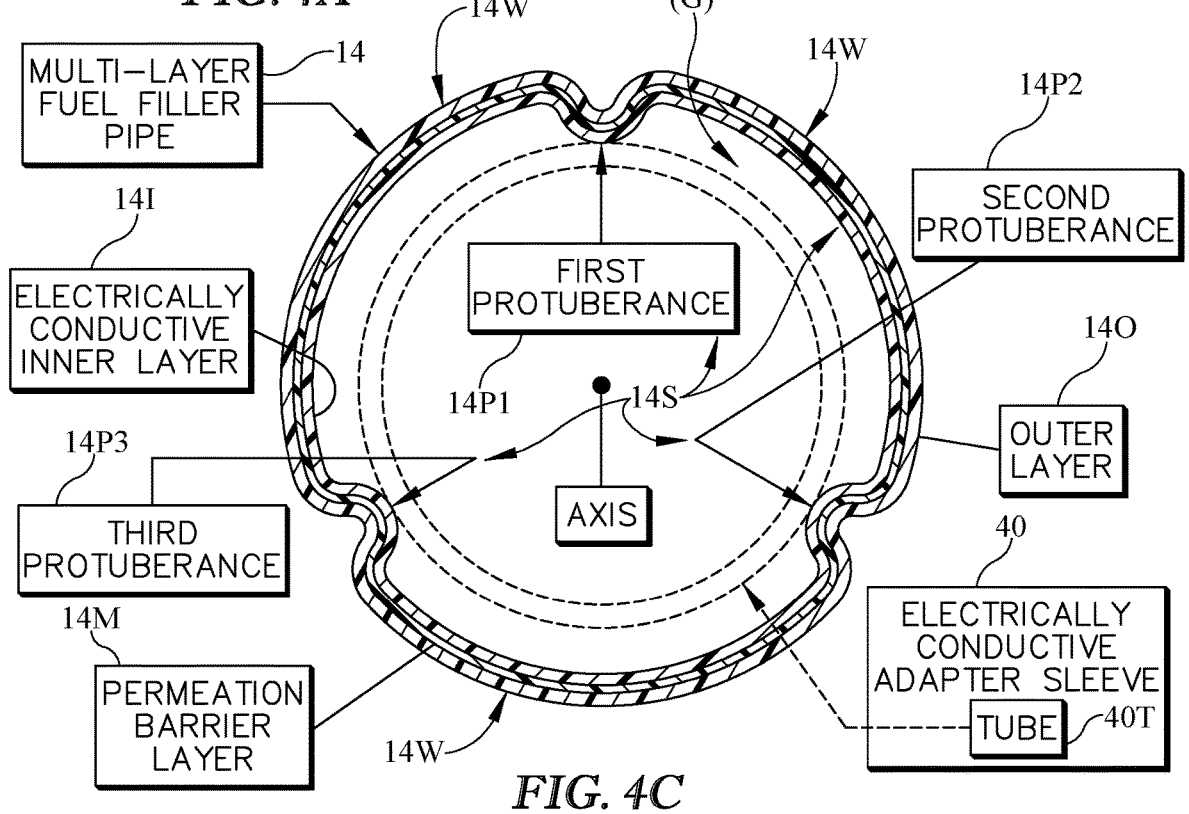
FIG. 4C

CAPLESS CLOSURE FOR FUEL FILLER PIPE

PRIORITY CLAIM

This application claims priority under 35 U.S.C. § 119(e) to U.S. Provisional Application No. 62/855,522, filed May 31, 2019, which is expressly incorporated by reference herein.

BACKGROUND

The present disclosure relates to a filler neck for a fuel tank, and particularly to a closure for a tank filler neck. More particularly, the present disclosure relates to a capless closure that permits a fuel-dispensing pump nozzle to be inserted into a tank filler neck to supply fuel to a fuel tank and closes the tank filler neck when the fuel-dispensing pump nozzle is removed from the closure.

Many vehicles include a fuel tank, a fuel-tank filler neck coupled to the fuel tank to communicate liquid fuel from a fuel-dispensing pump nozzle to the fuel tank, and a closure coupled to the fuel-tank filler neck to seal the fuel-tank filler neck. During refueling, the fuel-dispensing pump nozzle is passed by a user first through an outer chamber associated with an outer end of the fuel-tank filler neck and then through a nozzle-receiving aperture into a fuel-conducting passageway formed in the fuel-tank filler neck. Then the pump nozzle is actuated by the user to cause liquid fuel discharged by the pump nozzle to flow through the fuel-conducting passageway into the fuel tank.

SUMMARY

According to the present disclosure, a fuel-tank fill tube includes a fuel filler pipe that is formed to carry liquid fuel to a fuel tank. In illustrative embodiments, the fuel-tank fill tube is configured to conduct to a ground associated with a companion vehicle chassis the static energy that is generated in the fuel filler pipe (1) owing to contact of a portion of the fuel-tank fill tube with a tip of a moving fuel-dispensing pump nozzle during an initial stage of a tank-refueling activity or (2) exposure of the fuel filler pipe to swirling liquid fuel discharged from the tip of the fuel-dispensing pump nozzle into the fuel-conducting passageway formed in the fuel-tank fill tube during a later stage of the tank-refueling activity.

In illustrative embodiments, the fuel-tank fill tube also includes a nozzle-insertion housing that is formed to include an outer nozzle-receiving aperture and arranged to extend into a fuel-conducting passageway formed in the fuel filler pipe. The fuel-tank fill tube also includes an electrically-conductive spring-biased outer flapper door mounted on the nozzle-insertion housing to pivot relative to the outer nozzle-receiving aperture between OPENED and CLOSED positions when contacted by the tip of the moving fuel-dispensing pump nozzle to control access to the fuel-conducting passageway formed in the fuel filler pipe. The nozzle-insertion housing and the spring-based outer flapper door cooperate to provide a capless closure for the fuel filler pipe.

In illustrative embodiments, the fuel-tank fill tube also includes an adapter sleeve that surrounds most of the nozzle-insertion housing and is made of electrically conductive material that is in electrical communication with the electrically-conductive spring-based outer flapper door and with an electrically conductive inner layer of the fuel filler pipe. Static electricity that is extant in the fuel filler pipe is conducted by the adapter sleeve toward an exterior ground outside the fuel filler pipe so that such static electricity is dissipated. The adaptor sleeve provides an electrically conductive exterior terminal that can be connected by an electrically conductive outer housing-retainer ring and a grounding wire to an exterior ground associated with the chassis of a vehicle that supports a fuel tank coupled to the fuel-tank fill tube. The outer housing-retainer ring is configured to hold the nozzle-insertion housing and the adapter sleeve in a stationary position in an outer end of the fuel filler pipe.

In illustrative embodiments, the fuel-tank fill tube also includes an electrically conductive spring-biased inner flapper door, that is mounted on the nozzle-insertion housing for pivotable movement to open and close an inner nozzle-receiving aperture formed in the nozzle-insertion housing. The tip of the moving fuel-dispensing pump nozzle contacts and opens the spring-biased inner flapper door after it has contacted and opened the spring-biased outer flapper door.

In illustrative embodiments, NOZZLE-GENERATED static electricity is discharged from a moving fuel-dispensing pump nozzle as the tip of the nozzle touches electrically conductive material in the spring-biased outer flapper door to open the outer nozzle-receiving aperture at the start of a tank refueling activity. NOZZLE-GENERATED static electricity may also be discharged as the tip of the nozzle engages electrically conductive material in the spring-biased inner flapper door. This NOZZLE-GENERATED static electricity is conducted along a first static-electricity discharge path provided in the fuel-tank fill tube in accordance with the present disclosure to the electrically conductive outer housing-retainer ring via electrically conductive material in the spring-biased outer and inner flapper doors and the adapter sleeve. This NOZZLE-GENERATED static electricity is conducted to a ground associated with the vehicle chassis by a grounding wire coupled to the outer housing-retainer ring.

In illustrative embodiments, TURBULENCE-GENERATED static electricity is extant in the fuel-conducting passageway of the fuel filler pipe owing to discharge of liquid fuel by the fuel-dispensing pump nozzle into the fuel-conducting passageway during fuel tank refueling. This TURBULENCE-GENERATED static electricity is conducted along a second static-electricity discharge path provided in the fuel-tank fill tube in accordance with the present disclosure to the electrically conductive outer housing-retainer ring via electrically conductive material in an inner layer of the fuel filler pipe that is exposed to discharged liquid fuel swirling about in the fuel-conducting passageway formed in the fuel filler pipe and via electrically conductive material in the adapter sleeve. This TURBULENCE-GENERATED static electricity is then conducted to the ground associated with the vehicle chassis by the grounding wire coupled to the outer housing-retainer ring.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 4A is an enlarged view of a first circled region in FIG. 4 showing that the fuel filler pipe includes an outer layer, an electrically conductive inner layer, and an intermediate permeation barrier layer, and showing that one of the radially inwardly extending protuberances included in the fuel filler pipe includes those three layers;

FIG. 4B is an enlarged view of a second circled region in FIG. 4 showing the same three layers in an opposing portion of the fuel filler pipe;

FIG. 4C is an enlarged sectional view of the multi-layer fuel filter pipe of FIG. 4 taken along line 4C-4C of FIG. 4 to show that three circumferentially spaced-apart protrusions are formed in the fuel filler pipe and arranged to extend in radially inward directions toward a central vertical axis of the multi-layer fuel filler pipe to form an interference fit with a cylindrical tube of the electrically conductive adapter sleeve that is represented by the phantom lines in FIG. 4C but shown illustratively in FIG. 5 for one of the three protrusions;

DETAILED DESCRIPTION

Figure 1:
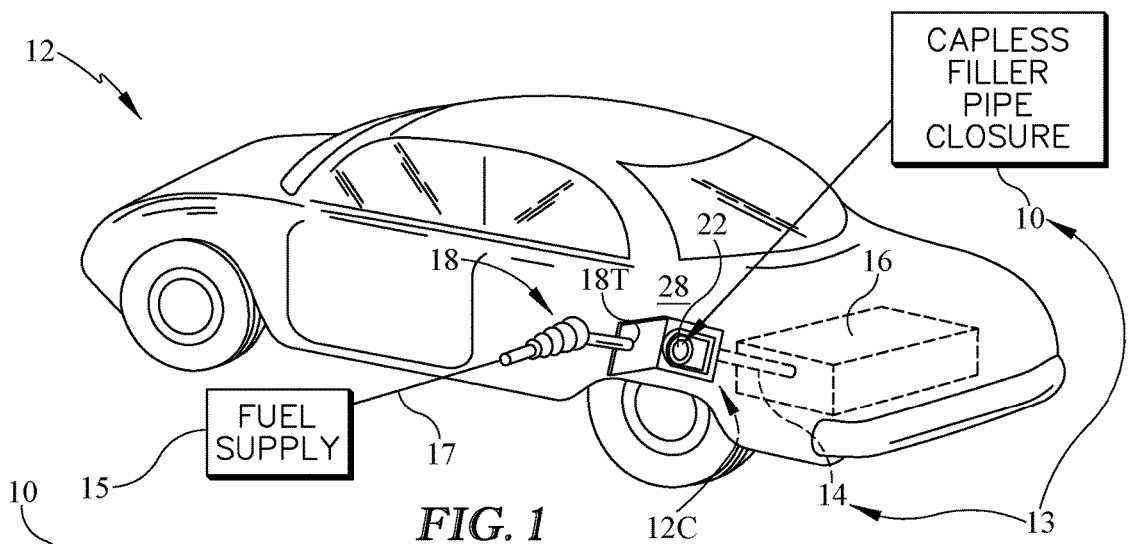
FIG. 1 is a perspective view showing an outer filler-neck access door moved to an OPENED position relative to a vehicle body panel to expose an illustrative capless filler pipe closure that is coupled to a fuel filler pipe leading to a vehicle fuel tank to provide a fuel-tank fill tube and showing a fuel-dispensing pump nozzle coupled to a fuel supply and configured to be inserted into the capless filler pipe closure during vehicle refueling to discharge liquid fuel into the fuel filler pipe leading to the vehicle fuel tank.

According to the present disclosure, a fuel-tank fill tube 13 comprises a capless filler pipe closure 10 that is provided in a vehicle to close a fuel filler pipe 14 extending from a fuel tank 16 onboard a vehicle 12 as shown in FIG. 1. Fuel filler pipe 14 is configured to accept a fuel-dispensing pump nozzle 18 during tank refueling as suggested in FIG. 1. Pump nozzle 18 is coupled to a fuel supply 11 by a hose 17. Capless filler pipe closure 10 is configured to close off fuel filler pipe 14 from the atmosphere until fuel-dispensing pump nozzle 18 is inserted into closure 10 after an appearance door 26 has been moved to an OPENED position relative to the body panel 28.

Fuel-tank fill tube 13 includes a nozzle-insertion housing 20 that is located in an outer end of fuel filler pipe 14. Nozzle-insertion housing 20 is formed to include an outer nozzle-receiving aperture 20OA opening into an outer chamber 201 and an inner nozzle-receiving aperture 201A that is located to interconnect outer chamber 201 in fluid communication with an inner chamber 202 that communicates with a fuel-conducting passageway 20P formed in fuel filler pipe 14 when nozzle-insertion housing 20 is located in the outer end of fuel filler pipe 14.

An electrically conductive spring-loaded nozzle-actuated outer flapper door 22 is also included in fuel-tank fill tube 13. Outer flapper door 22 is mounted on an outer end of nozzle-insertion housing 20 and urged by a companion door-biasing spring 23 normally to close the outer nozzle-receiving aperture 20A that is formed in nozzle-insertion housing 20 to open into outer chamber 201. Outer flapper door 22 pivots to assume an OPENED position when engaged by a tip 18T of a moving fuel-dispensing pump nozzle 18 as the nozzle 18 is inserted into the outer chamber 201 by a user during an initial stage of a tank refueling activity.

Fuel-tank fill tube 13 further includes an electrically conductive spring-biased nozzle-actuated inner flapper door 24 mounted on an inner end of nozzle-insertion housing 20 for movement relative to nozzle-insertion housing 20 between a CLOSED position closing the inner nozzle-receiving aperture 201A formed in nozzle-insertion housing 20 and an OPENED position opening that nozzle-receiving aperture 201A. During refueling, the tip 18T of a fuel-dispensing pump nozzle 18 is moved by a user to open outer flapper door 22 and subsequently passed through outer chamber 201 and inner nozzle-receiving aperture 201A so as to engage normally closed inner flapper door 24 and then move inner flapper door 24 against a closing force applied by a companion spring 25 to the OPENED position. Nozzle tip 18T is then moved past inner flapper door 24 into the inner chamber 202 that communicates with a fuel-conducting passageway 15 formed in fuel filler pipe 14. Pump nozzle 18 may then be actuated by a user to dispense liquid fuel 19 into the fuel-conducting passageway 15 that leads to fuel tank 16.

Fuel-tank fill tube 13 includes an electro-static discharge system in accordance with present disclosure that is arranged to conduct NOZZLE-GENERATED static electricity and also TURBULENCE-GENERATED static electricity that is extant in fuel filler pipe 14 to an exterior ground associated with a vehicle chassis 12C on which fuel tank 16 is mounted. Both types of static electricity are conducted by the electro-static discharge system to a vehicle-chassis ground 12C automatically to dissipate static electricity that develops in fuel-tank fill tube 13.

At the start of a fuel-tank refueling activity, NOZZLE-GENERATED static electricity is discharged onto the electrically conductive spring-loaded outer flapper door 22 by tip 18T of moving fuel-dispensing pump nozzle 18 as the nozzle 18 is inserted by a user into outer chamber 201 of nozzle-insertion housing 20 to contact the outer flapper door 22. Any NOZZLE-GENERATED static electricity owing to contact of nozzle tip 18T and the electrically conductive spring-loaded inner flapper door 24 also will be dissipated by the electro-static discharge system in accordance with the present disclosure. This NOZZLE-GENERATED static electricity flows as suggested by FIG. 6A from outer flapper door 22, along a first static-electricity discharge path P1 and from inner flapper door 24 along an alternative first static-electricity path P1A to an exterior ground such as a vehicle chassis 12C associated with fuel filler pipe 14 via a conductive outer housing-retainer ring 30 coupled to outer end of fuel filler pipe 14 and/or capless filler pipe closure 10.

Once liquid fuel 19 is discharged by the fuel-dispensing pump nozzle 18 into fuel-conducting passageway 15 of the fuel filler pipe 14, TURBULENCE-GENERATED static electricity can be created in fuel filler pipe 14. TURBU- LENCE-GENERATED static electricity is generated in fuel-conducting passageway 15 of fuel filler pipe 14 as a result of swirling liquid fuel flow 19T in fuel conducting passageway 15 of fuel filler pipe 14 during vehicle refueling. The electro-static discharge system in accordance with present disclosure is also arranged to conduct TURBULENCE-GENERATED static electricity as suggested in FIG. 7A along a second static-electricity discharge path P2 to an exterior ground associated with a vehicle chassis 12C via a conductive outer housing-retainer ring 30 or other suitable conductor.

Capless filler pipe closure 10 also includes an adapter sleeve 40 that is made of an electrically conductive material, e.g. an electrically conductive PA (polyamide material), and is configured to surround nozzle-insertion housing 20. Adapter sleeve 40 mates and cooperates with the electrically conductive spring-loaded outer flapper door 22 to establish an initial segment of first static-electricity discharge path P1 as suggested in FIG. 6A. Adapter sleeve 40 also mates and cooperates with the electrically conductive spring-loaded inner flapper door 24 to establish a longer alternative static-electricity discharge path P1A as suggested in FIG. 6A. The electrically conductive adapter sleeve 40 is also configured to mate and cooperate with an electrically conductive inner layer 14I of a multi-layer fuel filler pipe 14 made in accordance with present disclosure to establish an initial segment of second static-electricity discharge path P2 as suggested in FIG. 7A. The initial segments of first and second electricity discharge paths P1, P1A, P2 are joined together in electrically conductive adapter sleeve 40 to establish a unified middle segment of first and second discharge paths in an outermost section of adapter sleeve 40 as suggested in FIGS. 6A and 7A. A ground connector 50 such as a grounding wire or bracket is arranged to couple electrically (1) a conductive outer housing retainer ring 30 that is mounted on fuel filler pipe 14 to mate with outermost section of adapter sleeve 40 and (2) vehicle chassis 12C to cause any static electricity conducted along first and second static-electricity discharge paths to dissipate at the vehicle-chassis ground 12C as suggested in FIGS. 6A and 7A.

The electrically conductive adapter sleeve 40 is arranged to surround nozzle-insertion housing 20 and mate with an electrically conductive inner layer 14I of fuel filler pipe 14. The electrically conductive portions of spring-loaded outer and inner flapper doors 22, 24 mate with electrically conductive adapter sleeve 40. An electrically conductive crimp ring 30 is mounted on outermost end of fuel filler pipe 14 to mate with the electrically conductive adapter sleeve 40 and a ground connector 50 is arranged to electrically couple crimp ring 30 to an exterior ground of a vehicle chassis 12C associated with fuel-tank fill-tube 13. It is within the scope of the present disclosure to use a welded or brazed bracket or ground wire to provide ground connector 50.

Fuel filler pipe 14 comprises an annular inner layer 14I made, for example, of electrically conductive HDPE, an annular outer layer 40O made of HDPE, and an annular middle barrier layer 14M made of EVOH. The shape of outermost end of fuel filler pipe 14 is cone-shaped in accordance with present disclosure to establish an exposed cone-shaped (i.e., frusto-conical) exterior end edge 14ME of annular middle permeation layer 14M that has a length (L) that is greater than thickness (T) of annular middle permeation barrier layer 14M as shown in FIG. 8 to maximize sealing contact with O-ring seal 40S.

Capless filler pipe closure 10 includes an adapter sleeve 40 made of an electrically conductive material and a nozzle-insertion housing 20 carrying the electrically conductive spring-loaded inner and outer flapper doors 24, 22 and arranged to extend through a central passageway formed in a tube 40T of adapter sleeve 40. An O-ring seal 40S is also included in capless filler pipe closure 10 and arranged to mate and surround adapter sleeve 40 and to mate with outermost end of fuel filler pipe 14 to block discharge of fuel vapor from fuel-conducting passageway 15 to the atmosphere along a path provided between filler pipe closure 10 and fuel filler pipe 14.

Figure 8:
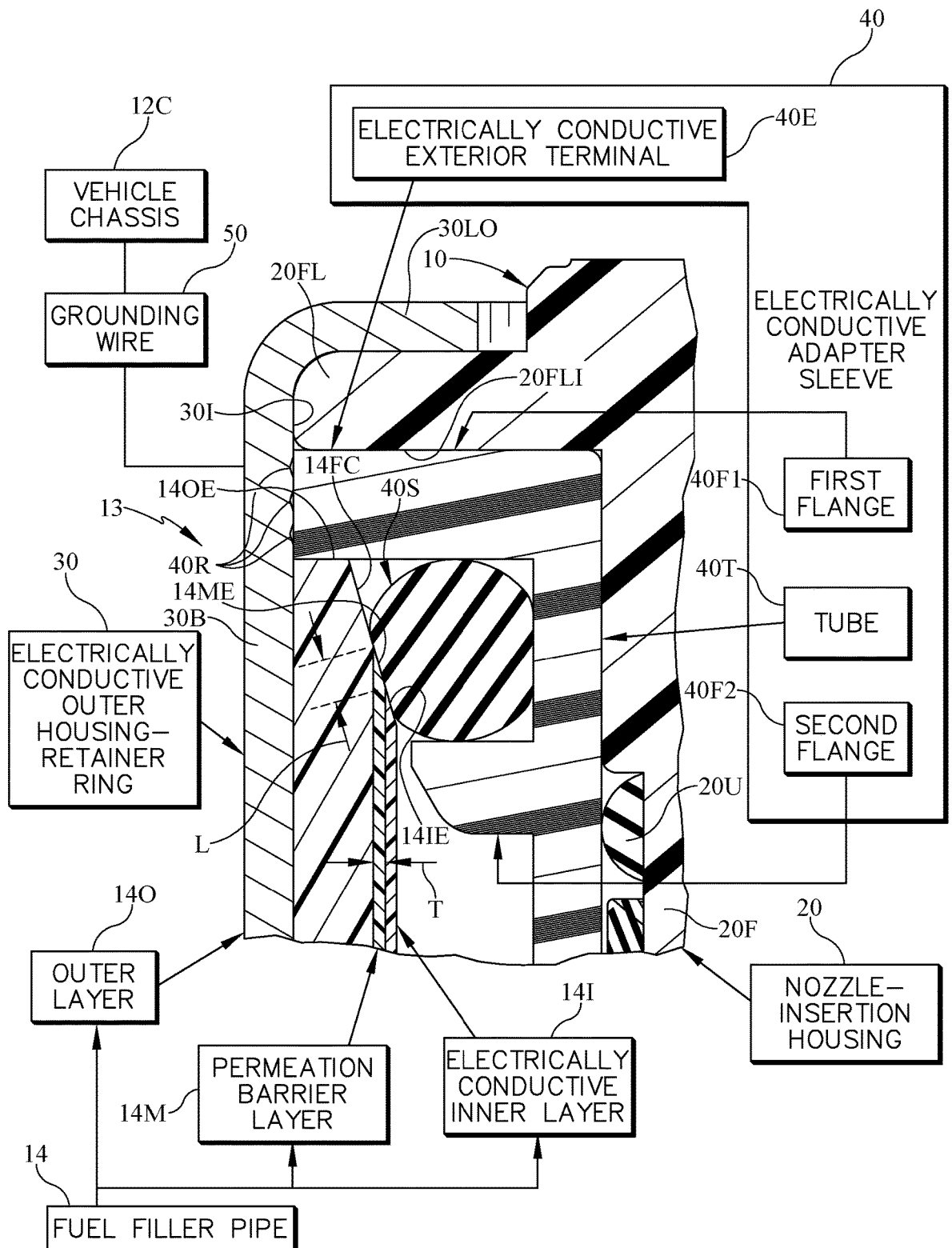
FIG. 8 is an enlarged view of the circled region of FIG. 5 showing that an inlet end of the fuel filler pipe is machined to establish a frusto-conical surface in accordance with the present disclosure to expose a tubular middle permeation barrier layer in the fuel filler pipe that is positioned to lie between a tubular outer layer and an electrically conductive tubular inner layer to cause the tubular middle permeation barrier layer to mate with the outer O-ring seal mounted on the adapter sleeve.

O-ring seal 40S of capless filler pipe closure 10 is mounted on an exterior surface of tube 40T as shown in FIG. 8. O-ring seal 40S is arranged to mate with an exposed cone-shaped end edge 14ME of annular permeation barrier layer 14M provided in outermost end of fuel filler pipe 14 to maximize surface area contact between O-ring seal 40S and annular permeation barrier layer 14M of fuel filler pipe 14, as shown, for example, in FIG. 8.

The fuel-tank fill-tube 13 disclosed herein illustratively comprises a multi-layer fuel filler pipe 14 made of plastics materials and produced by using a suction-blow-molding process. In accordance with present disclosure, a conical surface is machined on a leading edge of fuel filler pipe 14 to reveal an exposed cone-shaped end edge 14ME of middle permeation barrier layer 14M as shown in FIG. 8. This cone-shaped end edge 14ME has an expanded surface area better to mate with opposing O-ring seal 40S. O-ring seal 40S is made of FKM material. This O-ring seal 40S mates with exposed cone-shaped end edge 14ME of middle permeation barrier layer 14M to seal it off and block fuel vapor permeation from the fuel conducting passageway 15 of fuel filler pipe to the surrounding atmosphere.

Inwardly extending SPHERICAL features 14P on the fuel filler pipe 14 of the present disclosure ensure engagement of inner layer 14I of fuel filler pipe 14 to electrically conductive portions of capless filler pipe closure 10 to ensure an electro-static discharge circuit is formed in accordance with the present disclosure between inner diameter of fuel filler pipe 14 and capless filler pipe closure 10 and nozzle 18 and then through a metal crimp ring 30 to an exterior ground connector 50 coupled to vehicle chassis 12C. For example, fuel filler pipe 14 is formed to include three circumferentially spaced-apart protrusions 14P1, 14P2, and 14P3 that are each shaped in accordance with the present disclosure to provide an inwardly extending SPHERICAL feature.

O-ring seal 40S mates with adapter sleeve 40 and inner surface 14I of suction-blow-molded plastic filler pipe 14. The O-ring seal 40S also mates to an accurately machined conical surface on fuel filler pipe 14 as shown in FIG. 8. The end face of fuel filler pipe 14 is also machined to maintain an accurate axial stack-up between mating components as suggested in FIG. 8. Since suction-blow-molded plastic fuel filler pipe 14 has a multi-layer construction, the O-ring seal 40S mates with the fuel filler pipe's permeation-barrier layer 14M after layer 14M has been exposed to provide conical machined surface. 14ME

Figure 4:
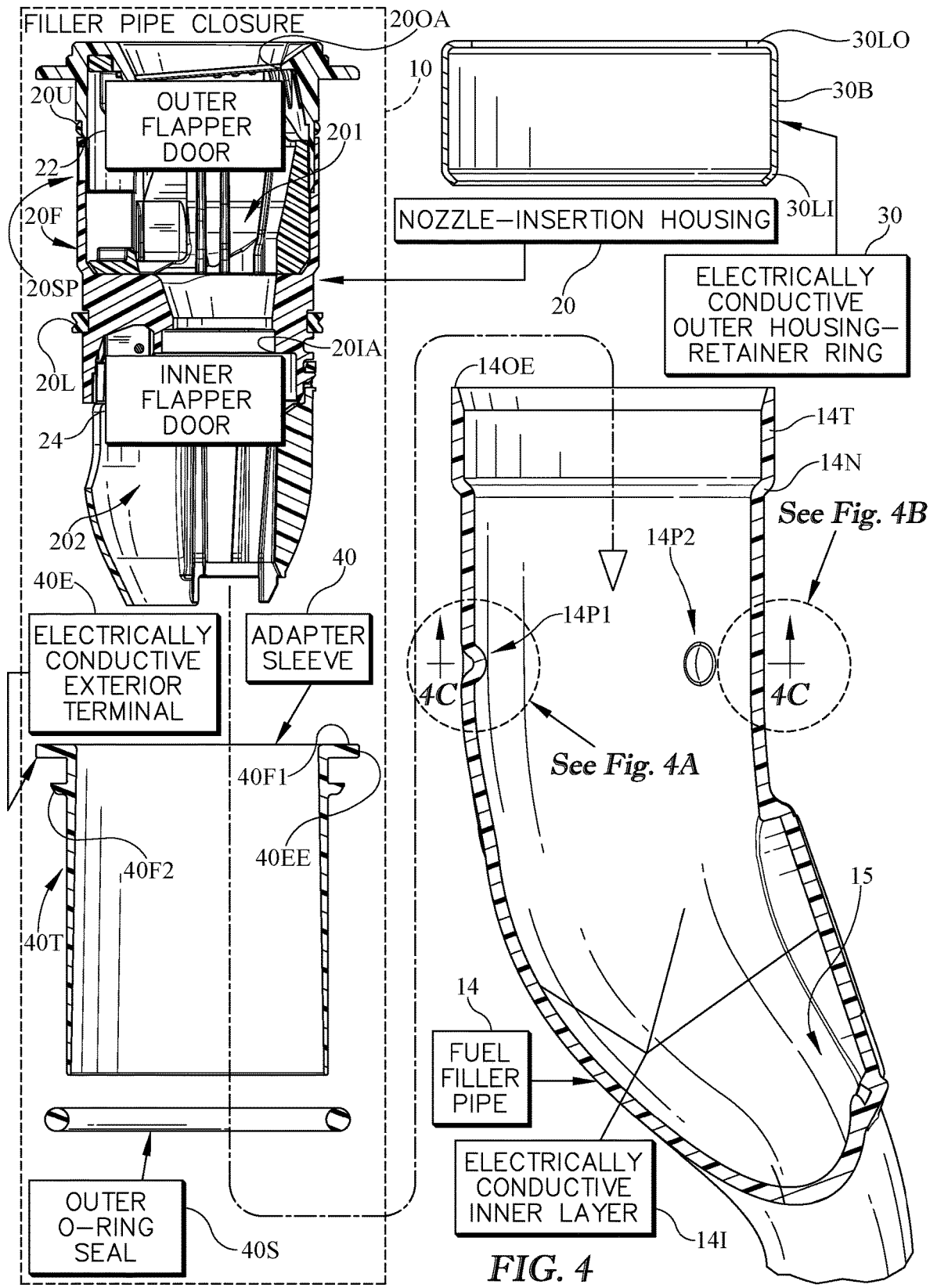
FIG. 4 is an exploded assembly view of components included in the fuel-tank fill tube of FIGS. 2 and 3 showing that the capless filler pipe closure includes an adapter sleeve made of electrically conductive material, an outer O-ring seal sized to fit between radially outwardly extending first and second flanges included in the adapter sleeve, a nozzle-insertion housing sized to slide downwardly into a central channel formed in a tube included in the adapter sleeve, spring-biased outer and inner flapper doors (shown diagrammatically) mounted in the nozzle-insertion housing, and upper and lower O-ring seals sized to mount on an exterior surface of a frame included in the nozzle-inserting housing and showing that the fuel-tank fill tube also includes a fuel filler pipe having an electrically conductive inner layer and an outer housing-retainer ring (e.g. crimp ring) that is made of an electrically conductive material (e.g. metal) and configured to engage the nozzle-insertion housing, the first flange of the adapter sleeve, and the fuel filler pipe to hold the nozzle-insertion housing in a stationary position in the fuel filler pipe as shown in FIG. 5, and further showing that a distal portion of the first flange of the adapter sleeve includes an electrically conductive exterior terminal that mates in electrical communication with electrically conductive material in the outer housing-retainer ring as suggested in FIG. 8 so that NOZZLE-GENERATED static electricity that has been transferred to the adapter sleeve along a first static-electricity charged path as suggested in FIG. 6A or TURBULENCE-GENERATED static electricity that has been transferred to the adapter sleeve along a second static-electricity discharge path as suggested in FIG. 7A is conducted to the exterior ground associated with a vehicle chassis via a grounding wire that interconnects the outer housing-retainer ring and the exterior vehicle-chassis ground.

Upper and lower O-ring seals 20U and 20L are included in the nozzle-insertion housing 20 as shown in FIG. 4. O-ring seals 20U and 20L mate with an inner surface of the adapter sleeve 40 while O-ring seal 40S mates with an outer surface of adapter sleeve 40 as shown, for example, in FIG. 6.

Also provided are three SPHERICAL bumps 14P1, 14P2, and 14P3 on fuel filler pipe 14 projecting radially inward as suggested in FIG. 4C to create an interference fit with adapter sleeve 40, which is molded of electrically-conductive PA (polyamide). These bumps 14P1-3 provide electrical connection for dissipating TURBULENCE-GENERATED static electricity within fuel filler pipe 14 during refueling. The interference fit provides a static discharge path from inner layer 141 of fuel filler pipe 14 to adapter sleeve 40. The static charge is routed via conductive inner layer 141 of fuel filler pipe 14 to the adapter sleeve 40, crimp ring 30, and vehicle-chassis ground 12C. The three bumps 14P1-3 also cooperate with upper and lower O-ring seals 20U, 20L to provide mechanical stability for adapter sleeve 40 AS SUGGESTED IN FIG. 4C.

Figure 2:
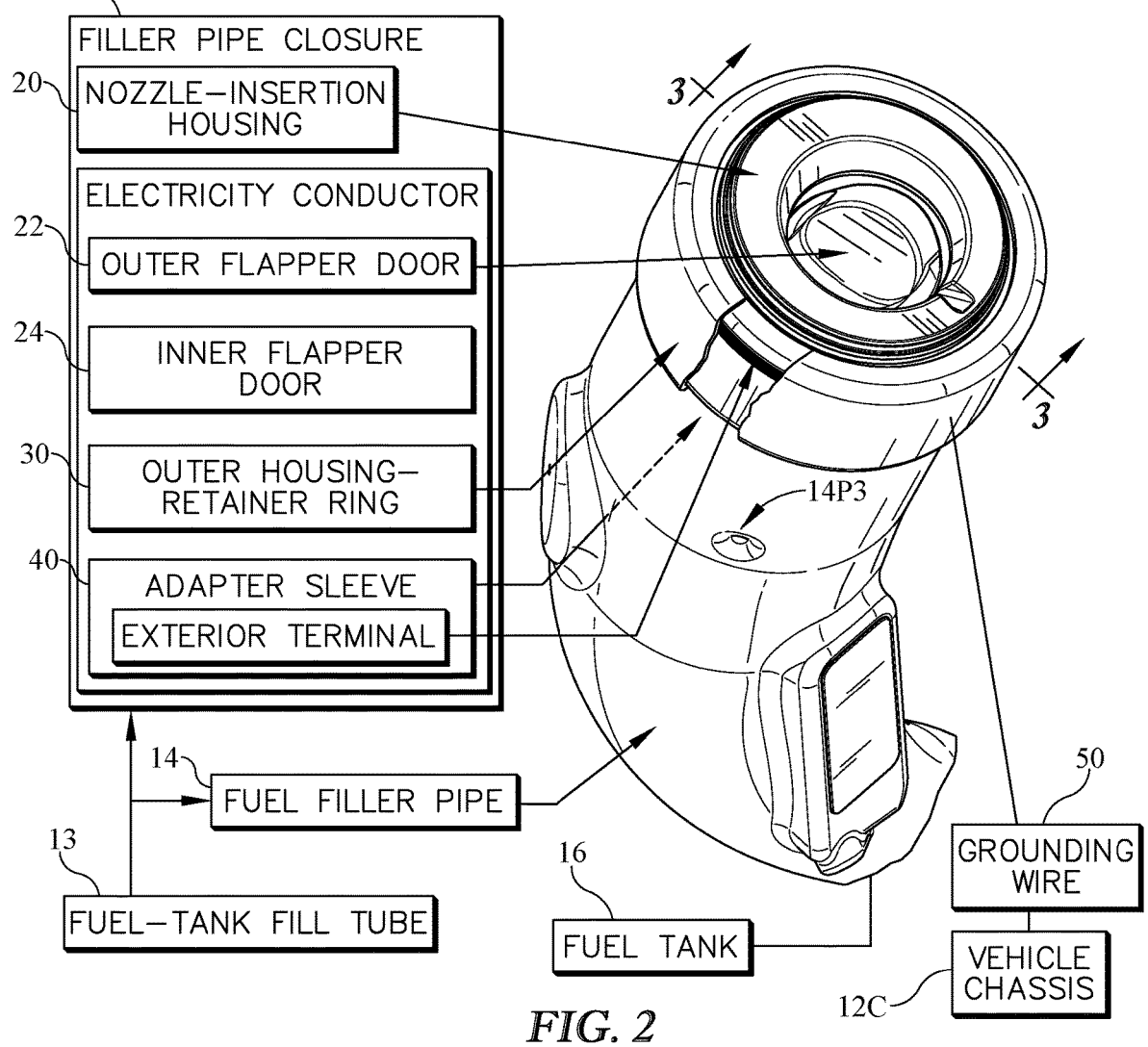
FIG. 2 is an enlarged perspective view of the fuel-tank fill tube of FIG. 1 showing that the fuel-tank fill tube includes a fuel filler pipe and a capless filler pipe closure coupled to an outer end of the fuel filler pipe and showing that the capless filler pipe closure comprises a nozzle-insertion housing formed to include an outer nozzle-receiving aperture and an electricity conductor configured to conduct NOZZLE-GENERATED static electricity along a first static electricity path to a vehicle-chassis ground as suggested diagrammatically in FIG. 6A and to conduct TURBULENCE-GENERATED static electricity to the vehicle chassis ground as suggested diagrammatically in FIG. 7A and suggesting that the electricity conductor comprises electrically conductive material in spring-biased outer and inner flapper doors, an adapter sleeve, and an outer housing-retainer ring for retaining the nozzle-insertion housing and the adapter sleeve in a stationary position on the fuel filler pipe and showing that the outer housing-retainer ring is broken away to reveal an electrically conductive exterior terminal included in the adapter sleeve and further showing that the outer housing-retainer ring is coupled in electrical communication by a grounding wire to a ground on a vehicle chassis that supports the fuel-tank fill tube.
Figure 3:
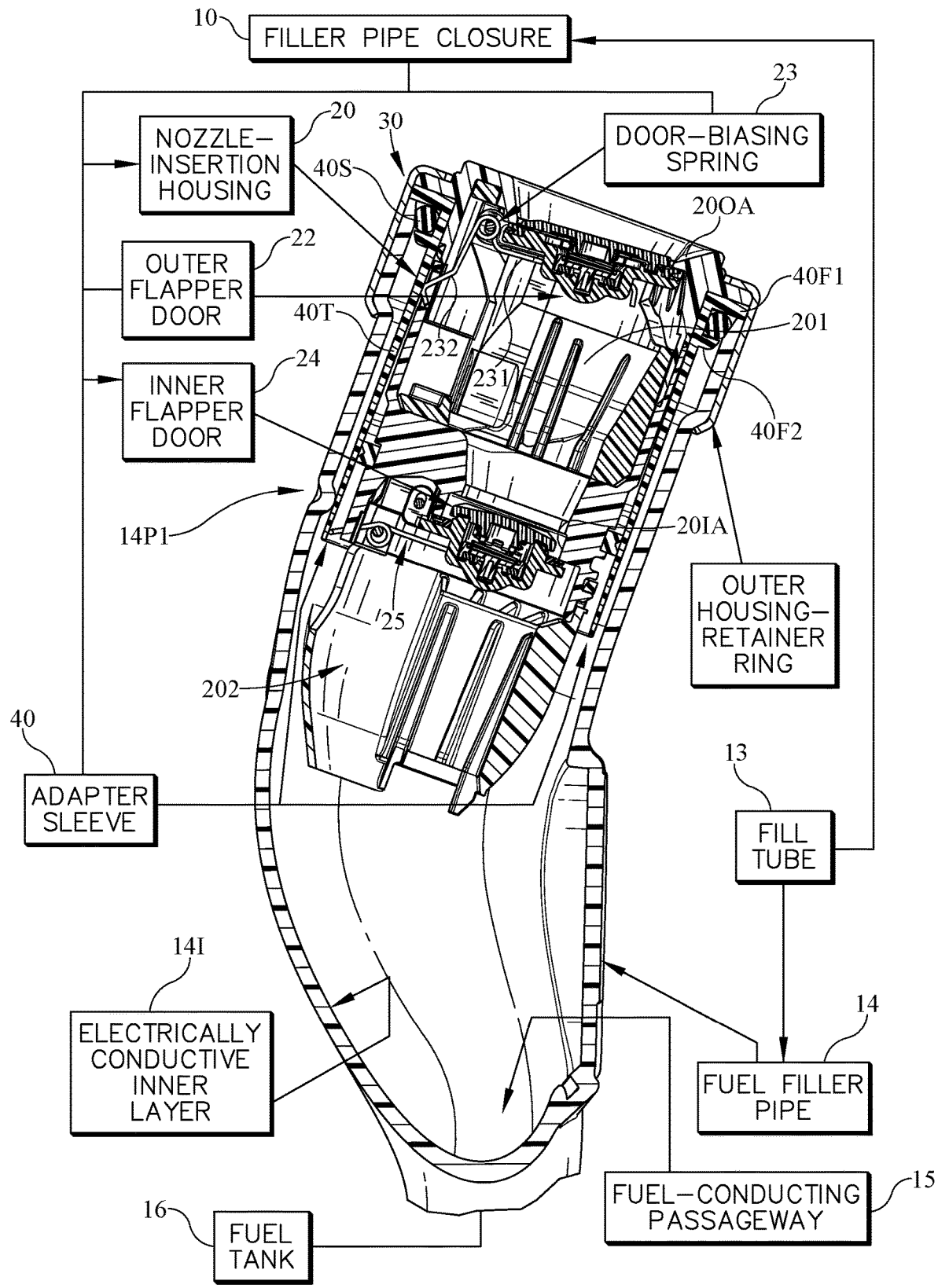
FIG. 3 is a sectional view taken along line 3-3 of FIG. 1 of a fuel-tank fill tube in accordance with the present disclosure showing an illustrative capless filler pipe closure including a nozzle-insertion housing mounted in an outer end of a fuel filler pipe having an electrically conductive inner layer, an electrically conductive spring-loaded nozzle-actuated outer flapper door located in an outer end of the nozzle-insertion housing and yieldably biased to assume a CLOSED position closing an outer nozzle-receiving aperture formed in an outer section of the nozzle-insertion housing, an electrically conducive spring-loaded inner flapper door yieldably biased to assume a CLOSED position closing a nozzle-receiving inner aperture formed in an inner section of the nozzle-insertion housing and arranged to lie in spaced-apart relation to the outer flapper door to define an outer chamber of the nozzle-insertion housing therebetween, an electrically conductive adapter sleeve arranged to surround the nozzle-insertion housing and to be surrounded by the fuel filler pipe so as to cause the electrically conductive adapter sleeve to contact an electrically conductive inner layer of the fuel filler pipe, and an electrically conductive metal outer housing-retainer ring mounted on the nozzle-insertion housing to establish electrical contact with electrically conductive material in the adapter sleeve.

A fuel-tank fill tube 13 includes a nozzle-insertion housing 20 and a fuel filler pipe 14 formed to include a fuel-conducting passageway 15 as suggested in FIGS. 2 and 3. Fuel-conducting passageway 15 is adapted to conduct liquid fuel 19 to a fuel tank 16 and sized to receive nozzle-insertion housing 20 therein as suggested in FIG. 7.

Nozzle-insertion housing 20 is arranged to extend downwardly into the fuel-conducting passageway 15 formed in the fuel filler pipe 14 as shown in FIG. 3. Nozzle-insertion housing 20 is formed to include an outer nozzle-receiving aperture 20OA opening into a nozzle-receiver channel communicating with the fuel-conducting passageway 15 formed in the fuel filler pipe 14. Nozzle-insertion housing 20 includes a frame 20F and upper and lower O-ring seals 20U, 20L mounted on an exterior portion of frame 20F as suggested in FIG. 4.

Figure 5:
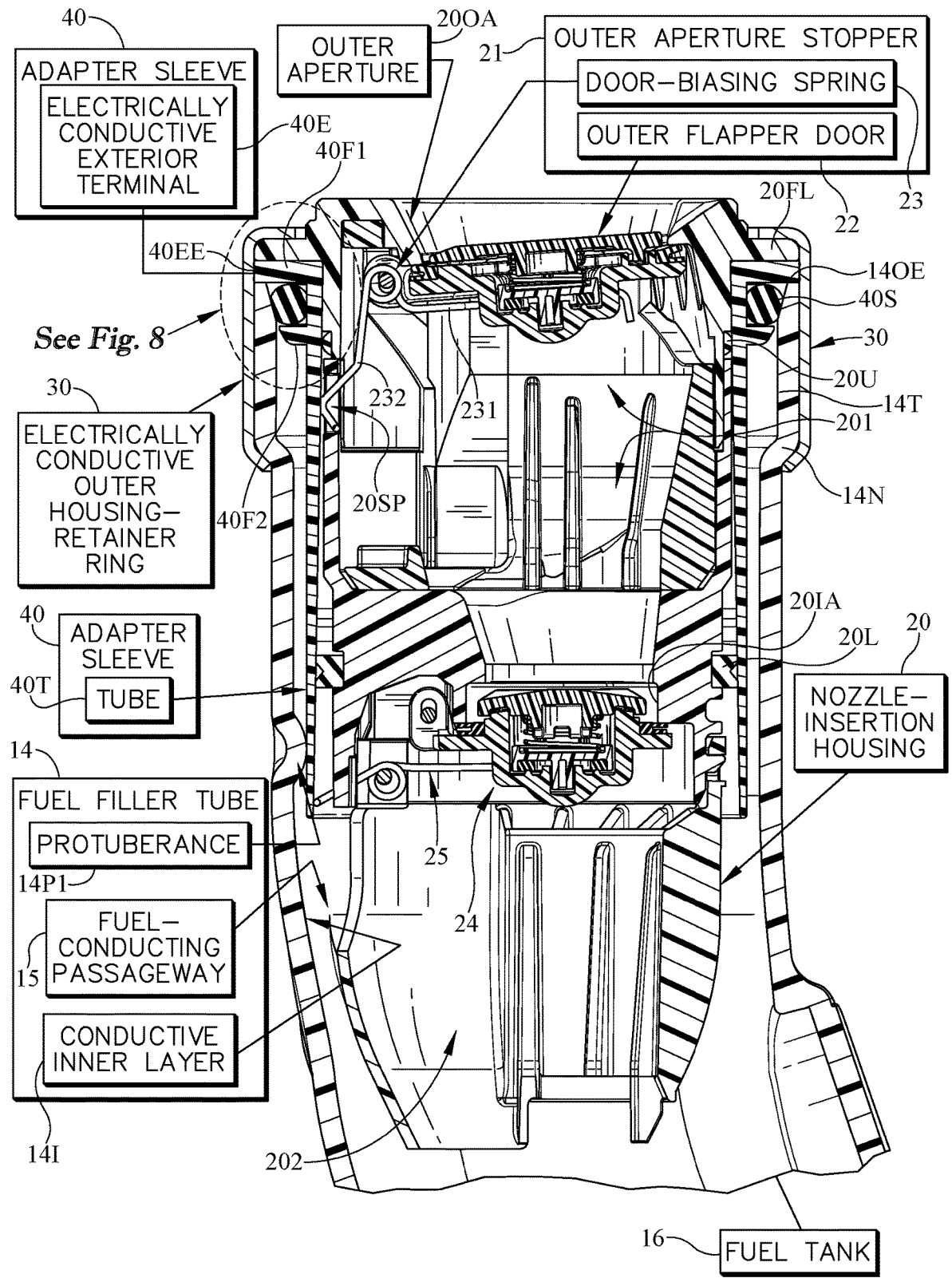
FIG. 5 is an enlarged view of the components shown in FIG. 4 after they have been assembled to close the open outer end of the fuel filler pipe.

Fuel-tank fill tube 13 further includes an outer-aperture stopper 21 that is shown in FIG. 5 and made of electrically conductive material. Outer-aperture stopper 21 is mounted on an outer edge of nozzle-insertion housing 20 for movement relative to housing 20 from a CLOSED position normally closing the outer nozzle-receiving aperture 20OA as shown in FIG. 5 to an OPENED position opening the outer nozzle-receiving aperture 20OA as shown in FIG. 6 in response to engagement with a tip 18T of a fuel-dispensing pump nozzle 18 moving toward the fuel-conducting passageway 15 formed in fuel filler pipe 14 during an initial stage of a fuel tank refueling activity.

Figure 6:
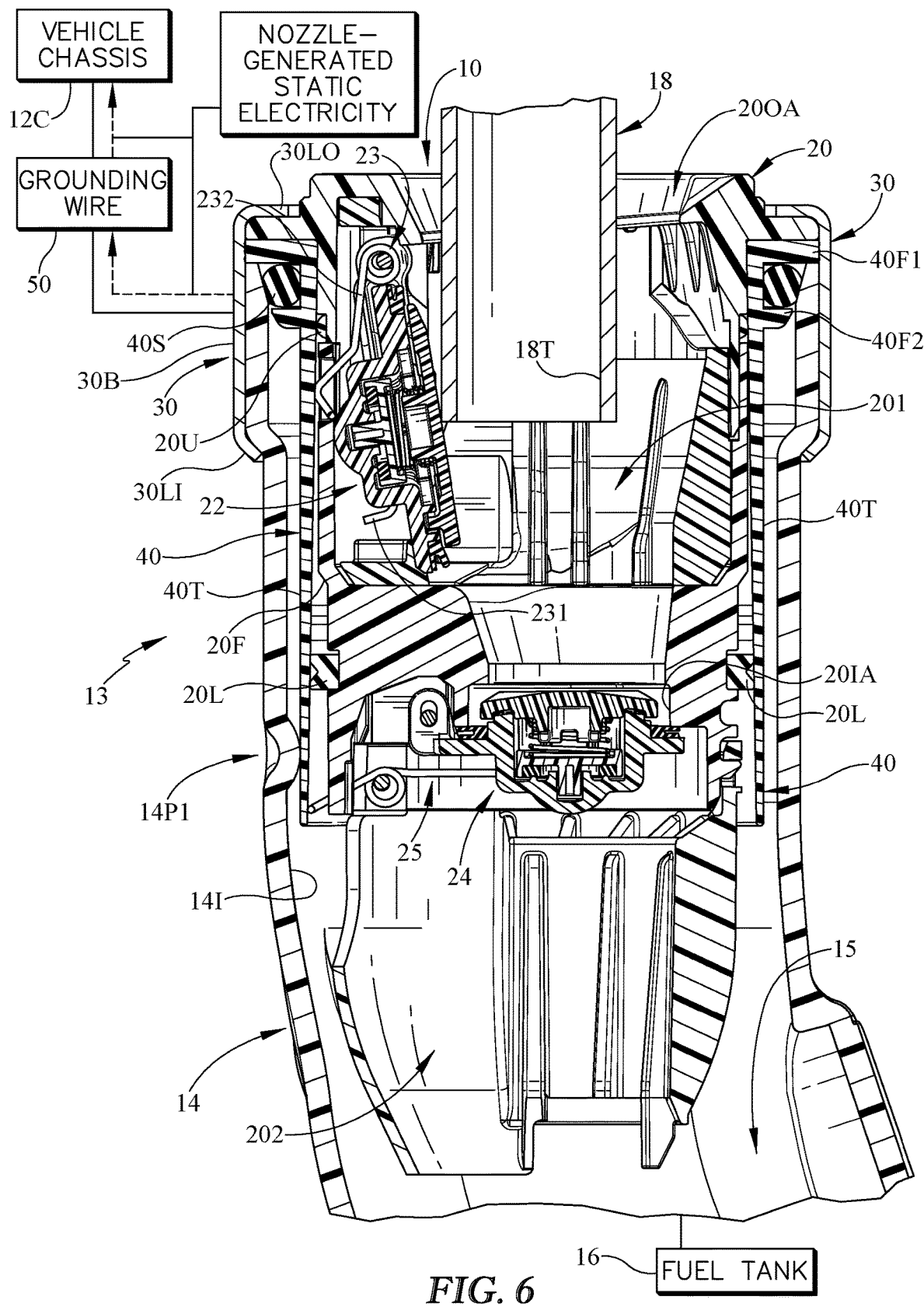
FIG. 6 is a view similar to FIG. 5 showing discharge of NOZZLE-GENERATED static electricity via the grounding wire to the vehicle chassis during an initial stage of a tank-refueling activity and showing movement of a tip of a fuel-dispensing pump nozzle as it is moved by a user into the nozzle-insertion housing through an outer nozzle-receiving aperture during the initial stage of a tank refueling activity to create NOZZLE-GENERATED static electricity in the fuel filler pipe and to cause the spring-biased outer flapper door of the nozzle-insertion housing to pivot from the NORMALLY CLOSED position shown in FIG. 5 to a TEMPORARILY OPENED position.
Figure 6A:
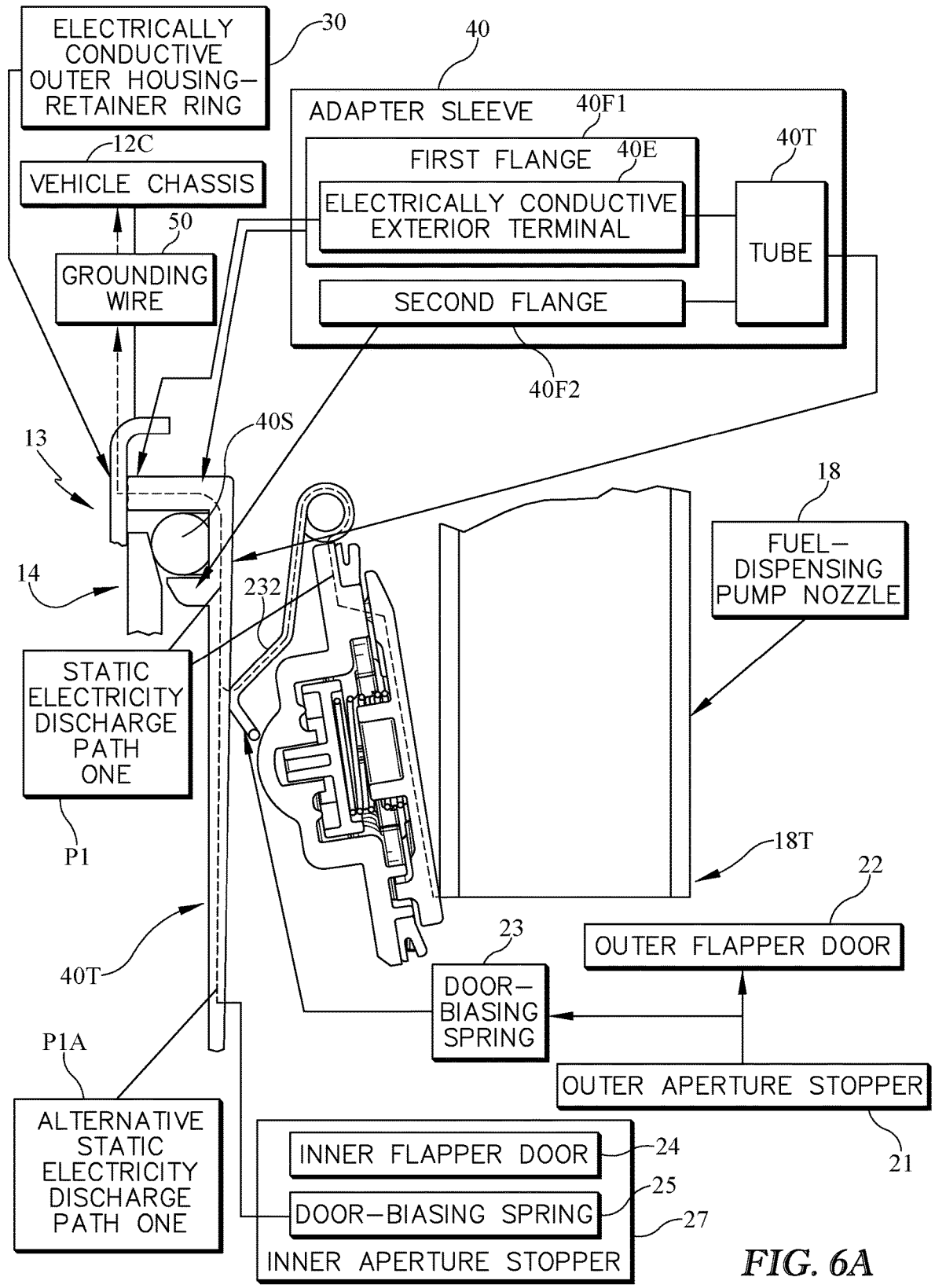
FIG. 6A is a diagrammatic view of a portion of the components shown in FIG. 6 suggesting that any NOZZLE-GENERATED static electricity that is generated during contact of the tip of the fuel-dispensing pump nozzle with the spring-biased outer flapper door is transferred from the fuel-dispensing pump nozzle to a ground associated with a vehicle chassis via a first static-electricity discharge path in accordance with the present disclosure that is provided, in sequence, by the outer flapper door, a door-biasing spring in electrically conducting engagement with the outer flapper door, a portion of the tube of the adapter sleeve in electrically conducting engagement with the door-biasing spring, an outer housing-retainer ring in electrically conducting engagement with the electrically conductive exterior terminal in the first flange of the adapter sleeve, and a grounding wire arranged in electrically conducting engagement with both of the outer housing-retainer ring and the exterior ground associated with the vehicle chassis.

Fuel-tank fill tube 13 also includes static-electricity discharge means for conducting NOZZLE-GENERATED static electricity transferred to the electrically conductive outer-aperture stopper 21 and to the electrically conductive inner-aperture stopper 27 by tip 18T of fuel-dispensing pump nozzle 18 first to an electrically conductive exterior terminal 40E that is associated with and located near to a distal end of fuel filler pipe 14 during movement of the outer-aperture stopper 21 from the CLOSED position to the OPENED position as suggested in FIG. 6. NOZZLE-GENERATED static electricity subsequently is discharged as suggested in FIG. 6A via the static-electricity discharge means from the electrically conductive exterior terminal 40E to an exterior vehicle-chassis ground 12C that is located in spaced-apart relation to the fuel filler pipe 14 and associated with a vehicle chassis 12C adapted to support the fuel filler pipe 14.

Figure 7:
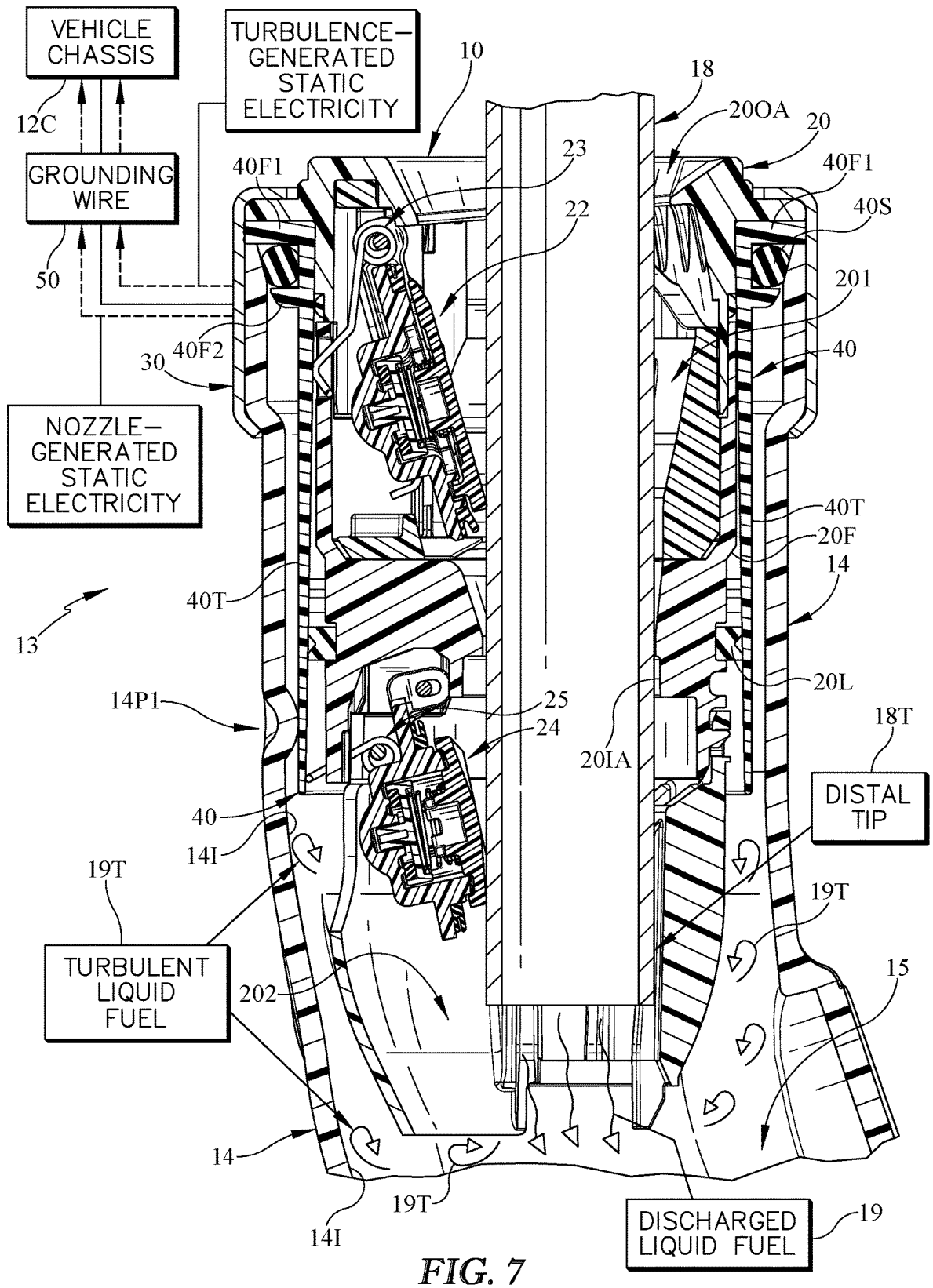
FIG. 7 is a view similar to FIG. 6 showing discharge of NOZZLE-GENERATED and TURBULENCE-GENERATED static electricity via the grounding wire to the vehicle chassis during discharge of liquid fuel from a pump nozzle into the fuel filler pipe after continued inward movement of the fuel-dispensing pump nozzle to cause the electrically conductive spring-biased inner flapper door to pivot from the NORMALLY CLOSED position shown in FIGS. 5 and 6 to a TEMPORARILY OPENED position.

Fuel-tank fill tube 13 also includes an inner aperture stopper 27 that is shown in FIG. 5 and made of electrically conductive material. Inner aperture stopper 27 is mounted on nozzle-insertion housing 20 for movement relative to housing 20 from a CLOSED position normally closing the inner nozzle-receiving aperture 20IA as shown in FIGS. 5 and 6 to an OPENED position opening the inner nozzle-receiving aperture 20IA as shown in FIG. 7 in response to engagement with a tip 18T of a fuel-dispensing nozzle 18 moving further toward the fuel-conducting passageway 15 formed in fuel filler pipe 14 during a tank refueling activity.

The static-electricity discharge means in accordance with the present disclosure comprises an adapter sleeve 40 shown in FIG. 4 and made of an electrically conductive material. Adapter sleeve 40 is formed to include a tube 40T configured to surround the nozzle-insertion housing 20 and arranged to lie in an annular space provided between an exterior surface of nozzle-insertion housing 20 and an interior surface of fuel filler pipe 14 as suggested in FIGS. 4 and 5. Adapter sleeve 40 further includes a radially outwardly extending first flange 40F1 appended to an upper end of tube 40T and configured to provide the electrically conductive exterior terminal 40E at a distal end thereof as suggested in FIG. 5. First flange 40F1 illustratively has an annular shape so as to provide electrically conductive exterior terminal 40E with a radially outwardly facing end edge 40EE as suggested in FIGS. 4 and 5.

The static-electricity discharge means in accordance with the present disclosure further includes a radially outwardly extending second flange 40F2 appended to a relatively lower portion of the tube 40T to lie in spaced-apart relation to the radially outwardly extending first flange 40F1 as shown in FIG. 4. A distal end of the radially outwardly extending second flange 40F2 is arranged to lie in spaced-apart relation to the interior surface of the fuel filler pipe 14 to form an annular gap therebetween. The static-electricity discharge means in accordance with the present disclosure further includes an O-ring seal 40S positioned to lie in a seal-receiver space formed between the radially outwardly extending first and second flanges 40F1, 40F2 as shown in FIGS. 5 and 8 to cause the O-ring seal 40S to sealingly engage at least each of the tube 40T and the fuel filler pipe 14.

Fuel filler pipe 14 has a multilayer construction and comprises a middle permeation barrier layer 14M interposed between outer and inner layers of 14O, 14I as suggested in FIGS. 4A-C. Each layer 14O, 14M, 14I has a tubular shape.

Fuel filler pipe 14 comprises an ethyl-vinyl-alcohol permeation barrier layer 14M formed to include a frusto-conical distal end 14ME. Permeation barrier layer 14M is arranged to lie in mating engagement with a downwardly facing portion of the O-ring seal 40S included in the static-electricity discharge means as suggested in FIG. 8.

Fuel filler pipe 14 includes an outer layer 14O made of plastics material and arranged to engage the radially outwardly extending first flange 40F1 as suggested in FIG. 8. Outer layer 14O provides a radially outwardly facing exterior surface of the fuel filler pipe 14. Ethyl-vinyl-alcohol permeation barrier layer is arranged to mate with a radially inwardly facing surface of the outer layer 14O. Distal end portions 14OE, 14ME of each of the outer and ethyl-vinyl-alcohol permeation barrier layers 14O, 14M cooperate to form a frusto-conical surface that lies in mating engagement with a downwardly facing portion of the O-ring seal 40S included in the static-electricity discharge means as shown in FIG. 8.

Fuel filler pipe 14 further includes an inner layer 141 made of electrically conductive material and arranged to surround portions of tube 40T of adapter sleeve 40 as suggested in FIG. 3. Ethyl-vinyl-alcohol permeation barrier 14M is interposed between the inner and outer layers 141, 14O as suggested in FIGS. 4A-C and 8. Inner layer 141 includes a frusto-conical distal end 141E arranged to lie in mating engagement with a downwardly facing portion of the O-ring seal 40S included in the static-electricity discharge means as suggested in FIG. 8.

Distal end portion of the outer layer 14O of the fuel filler pipe 14 further includes an annular end surface 14OE that is arranged to lie in mating engagement with an axially inwardly facing side surface of the radially outwardly extending first flange 40F1 of the adapter sleeve 40 as suggested in FIG. 8. Nozzle-insertion housing 20 includes a radially outwardly extending annular flange 20FL that is arranged to lie in mating engagement with an axially outwardly facing side surface of the radially outwardly extending first flange 40F1 of the adapter sleeve 40 to trap the radially outwardly extending first flange 40F1 of the adapter sleeve 40 between the radially outwardly extending annular flange 20FL of the nozzle-insertion housing 20 and the outer layer 140 of the fuel filler pipe 14 as shown in FIG. 8.

The static-electricity discharge means includes an O-ring seal 40S arranged to lie in sealing engagement with each of (1) tube 40T of adapter sleeve 40 and (2) fuel filler pipe 14 as suggested in FIG. 8. Fuel filler pipe 14 includes a radially outwardly facing outer layer 140, a radially inwardly facing inner layer 141, and an ethyl-vinyl-alcohol permeation barrier layer 14M interposed between the radially outwardly facing outer layer 140 and the radially inwardly facing inner layer 141. Ethyl-vinyl-alcohol permeation barrier layer 14M has a frusto-conical end surface 14ME that lies in mating engagement with a portion of the O-ring seal 40S in the static-electricity discharge means. The radially outwardly facing outer layer 140 of the fuel filler pipe 14 includes an annular end surface 14OE that is arranged to mate with the radially outwardly extending first flange 14F1 of the adapter sleeve 40 and a frusto-conical end surface 14FC that is arranged to lie alongside the frusto-conical end surface 14ME of the ethyl-vinyl-alcohol permeation barrier layer 14M to mate with a portion of the O-ring seal 40S of the static-electricity discharge means as shown in FIG. 8.

Outer-aperture stopper 21 and inner aperture stopper 27 each comprise electrically conductive material that contacts electrically conductive material in tube 40T of adapter sleeve 40 to cause NOZZLE-GENERATED static electricity discharged from outer-aperture stopper 21 and inner aperture stopper 27 to transfer to the electrically conductive exterior terminal 40E included in the radially outwardly extending first flange 40F1 via tube 40T of adapter sleeve 40 as suggested in FIG. 5. This NOZZLE-GENERATED static electricity flows along static electricity discharge path one P1 or P1A as suggested in FIG. 6A.

The static-electricity discharge means further includes an outer housing-retainer ring (e.g. a crimp ring made of metal such as stainless steel) 30 arranged to retain nozzle-insertion housing 20 in a stationary position relative to fuel filler pipe 14 to trap the electrically conductive exterior terminal 40E of adapter sleeve 40 in a fixed position between portions of each of fuel filler tube 14 and nozzle-insertion housing 20 as suggested in FIG. 5. Outer housing-retainer ring 30 includes electrically conductive material positioned to lie in electrical communication with electrically conductive material included in the electrically conductive exterior terminal 40E of adapter sleeve 40 for distribution to the electrically conductive exterior terminal 40E of adapter sleeve 40.

An electrically conductive grounding wire 50 is also included in the static-electricity discharge means in accordance with the present disclosure. The grounding wire 50 is coupled to electrically conductive material in the outer housing-retainer ring 30 as suggested in FIGS. 5 and 8. Grounding wire 50 is adapted to be coupled electrically to a ground associated with a vehicle chassis 12C configured to support the fuel filler tube 14.

Outer-aperture stopper 21 includes an outer flapper door 22 and an outer door-biasing spring 23 as suggested in FIG. 5. Outer flapper door 22 is mounted on nozzle-insertion housing 20 for pivotable movement about an outer pivot axis between an OPENED position opening the outer nozzle-receiving aperture 20OA and a CLOSED position closing the outer nozzle-receiving aperture 20OA. Outer door-biasing spring 23 is arranged to contact electrically conductive material in tube 40T of adapter sleeve 40 and to engage outer flapper door 22 normally and yieldably to pivot outer flapper door 22 about outer pivot axis to assume the CLOSED position. Outer flapper door 22 and outer door-biasing spring 23 each comprise electrical conductive material to transfer NOZZLE-GENERATED static electricity discharged onto outer flapper door 22 during engagement of a tip 18T of the fuel-dispensing pump nozzle 18 and the outer flapper door 22 to electrically conductive material in tube 40T of adapter sleeve 40 for distribution to the electrically conductive exterior terminal 40E of adapter sleeve 40. The foregoing disclosure also applies to inner flapper door 24 and inner door-biasing spring 25.

Outer door-biasing spring 23 is located in an interior region 201 formed in nozzle-insertion housing 20 as suggested in FIG. 5. Outer door-biasing spring 23 is arranged to extend through a spring-passage channel 20SP (See FIG. 4) formed in nozzle-insertion housing 20 to reach and contact electrically conductive material in tube 40T of adapter sleeve 40 that is arranged to extend around an exterior surface of nozzle-insertion housing 20.

Nozzle-insertion housing 20 includes a frame 20F formed to include the nozzle-receiving channel 201 and the outer nozzle-receiving aperture 20OA opening into the nozzle-receiving channel 201 as suggested in FIG. 4. Outer flapper door 20 is mounted on frame 20F for pivotable movement about the outer pivot axis and is located in the nozzle-receiving channel 201. Door-biasing spring 23 is arranged to contact the outer flapper door 22 normally to yieldably urge the outer flapper door 22 to the CLOSED position as shown in FIG. 3.

Nozzle-insertion housing 20 further includes a lower O-ring seal 20L and an upper O-ring seal 20U as shown in FIG. 4. Lower O-ring seal 20L is coupled to frame 20F and arranged to extend radially outwardly to engage a radially inwardly facing interior surface of tube 40T of adapter sleeve 40 as suggested in FIG. 5. Upper O-ring seal 40S is coupled to frame and arranged to extend radially outwardly to engage the radially inwardly facing interior surface of tube 40T of adapter sleeve 40 as suggested in FIG. 5. Spring-passage channel 20SP is located between the lower and upper O-ring seals 20L, 20U as shown in FIGS. 4 and 5.

Adapter sleeve 40 is made of an electrically conductive material and configured to provide the electrically conductive exterior terminal 40E. Door-biasing spring 23 is arranged to extend from the nozzle-receiving channel 201 through a spring-passage channel 20SP formed in frame of nozzle-insertion housing 20 to cause electrically conductive material in door-biasing spring 23 to contact electrically conductive material in adapter sleeve 40 when electrically conductive material in outer flapper door 22 in electrical communication with electrically conductive material in door-biasing spring 23 is engaged by tip 18T of fuel-dispensing pump nozzle 18 as suggested in FIG. 6 to allow transfer of NOZZLE-GENERATED static electricity from the outer flapper door 22 to the electrically conductive exterior terminal 40E in adapter sleeve 40 via electrically conductive material in door-biasing spring 23 as suggested in FIG. 6A. The foregoing disclosure also applies to inner flapper door 24 and inner door-biasing spring 25.

Door-biasing spring 23 comprises a first leg 231 and a second leg 232 as shown in FIG. 5. First leg 231 contacts electrically conductive material in outer flapper door 22.

Second leg 232 contacts electrically conductive material in adapter sleeve 40 when outer flapper door 22 is in the OPENED and CLOSED positions.

Outer housing-retainer ring 30 is engaged to fuel filler pipe 14 and nozzle-insertion housing 20 so as to retain nozzle-insertion housing 20 in a stationary position extending into the fuel-conducting passageway 15 formed in fuel filler pipe 14 as suggested in FIG. 3. Outer housing-retainer ring 30 includes electrically conductive material positioned to lie in electrical communication with electrically conductive material included in the electrically conductive exterior terminal 40E of adapter sleeve 40.

An outer end of fuel filler pipe 14 terminates at an annular outer surface 14OE as shown in FIGS. 4, 5, and 8. Nozzle-insertion housing 20 includes a mount flange 20FL having an annular inner surface 20FLI facing toward the annular outer surface 14OE of the outer end of fuel filler pipe 14. The electrically conductive exterior terminal 40E is interposed between annular outer and inner surfaces 14OE, 20FLI and includes a radially outwardly facing outer edge 40EE in engagement with a radially inwardly facing surface 30I of outer housing-retainer ring 30 as shown in FIG. 8.

Fuel filler pipe 14 includes a tubular member 14T including the annular outer surface 14OE and a nozzle-shaped member 14N as shown in FIG. 4. Nozzle-shaped member 14N is arranged to lie in spaced-apart relation to mount flange 20PL of nozzle-insertion housing 20 to locate tubular member 14T therebetween as shown in FIG. 5. Outer housing-retainer ring 30 includes a cylindrical band 30B arranged to surround tubular member, electrically conductive exterior terminal 40E, and mount flange 20FL, a radially inwardly inner turned lip 30LI coupled to an inner end of cylindrical band 30B as shown in FIG. 4 and arranged to mate with an exterior surface of nozzle-shaped member 14N of fuel filler pipe 14 as shown in FIG. 5, and a radially inwardly turned outer lip 30LO coupled to an outer end of cylindrical band as shown in FIG. 4 and arranged to mate with mount flange 20FL to retain nozzle-insertion housing 20 in the stationary position extending into fuel-conducting passageway 15 as shown in FIG. 5.

Adapter sleeve 40 is made of an electrically conductive material. Adapter sleeve 40 is shown, for example, in FIG. 4 and includes a tube 40T arranged to surround nozzle-insertion housing 20 and a radially outwardly extending first flange 40F1 coupled to tube 40T and configured to provide the electrically conductive exterior terminal 40E at a distal end thereof. Tubular member 14T of fuel filler pipe 14 is interposed between tube 40T of adapter sleeve 40 and cylindrical band 30B of outer housing-retainer ring 30 as shown in FIG. 5. O-ring seal 40S is positioned to lie in sealing engagement with each of tubular member 14T of fuel filler pipe 14 and tube 40T of adapter sleeve 40. The electrically conductive exterior terminal 40E includes a radially outwardly facing surface 40EE and several radially outwardly extending crush ribs 40R cantilevered to the radially outwardly facing surface of the electrically conductive exterior terminal 40E as shown in FIG. 8 to extend into the electrically conductive material in cylindrical band 30B of outer housing-retainer ring 30 to ensure electrical communication between adapter sleeve 40 and outer housing-retainer ring 30.

Figure 7A:
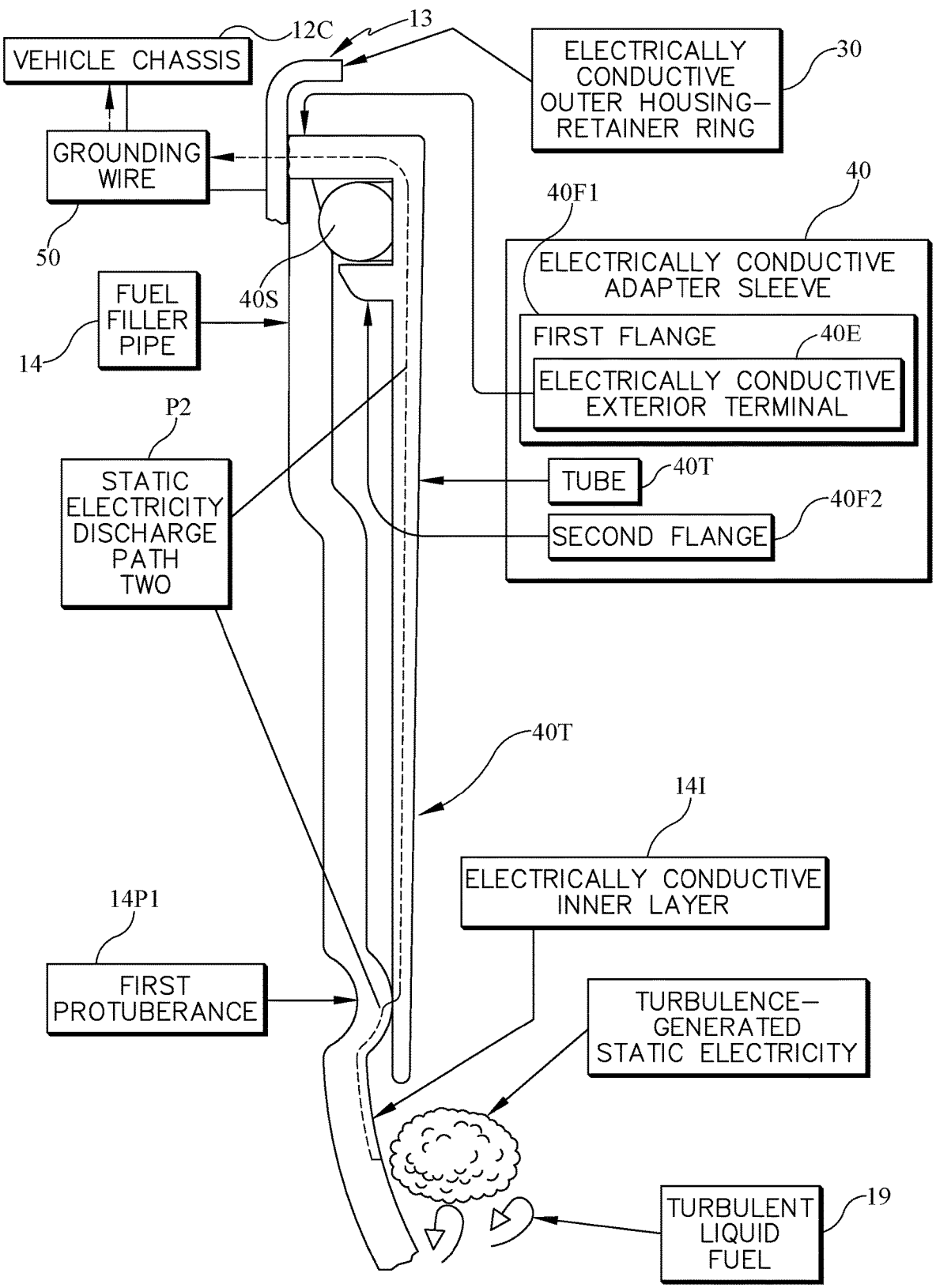
FIG. 7A is a diagrammatic view of a portion of the components shown in FIG. 7 suggesting that any TURBULENCE-GENERATED static electricity that is generated owing to swirling flow of liquid fuel dispensed into the fuel-conducting passageway formed in the fuel filler pipe by the fuel-dispensing pump nozzle is transferred to an exterior ground associated with the vehicle chassis via a second static-electricity discharge path in accordance with the present disclosure that is provided, in sequence, by an electrically conductive inner layer of the fuel filler pipe that is exposed to the swirling flow of liquid fuel in the fuel filler pipe, the tube of the electrically conductive adapter sleeve that is in electrical communication with a portion of the electrically conductive inner layer included in a radially inwardly extending protrusion of the fuel filler pipe, an outer housing-retainer ring in electrically conducting engagement with the adapter sleeve, and a grounding wire arranged in electrically conducting engagement with both of the outer housing-retainer ring and the exterior ground associated with the vehicle chassis.

Fuel filler pipe 14 includes static-electricity transfer means for conducting TURBULENCE-GENERATED static electricity extant in fuel filler pipe 14 owing to discharge of liquid fuel 19 from fuel-dispensing pump nozzle 18 into the fuel-conducting passageway 15 formed in fuel filler pipe 14 during a fuel-tank refueling activity as suggested in FIG. 7 to the static-electricity discharge means so that the TURBULENCE-GENERATED static electricity is conducted to the electrically conductive exterior terminal 40E of adapter sleeve 40 for distribution to the exterior ground associated with vehicle chassis 12C as suggested in FIG. 7A. The static-electricity transfer means comprises an inner layer 141 of fuel filler pipe 14 made of electrically conductive material exposed to liquid fuel 19 flowing in fuel-conducting passageway 15 of fuel filler pipe 14 as suggested in FIGS. 7 and 7A.

Adapter sleeve 40 is made of an electrically conductive material and formed to include a tube 40T configured to surround nozzle-insertion housing 20 as suggested in FIG. 5. The electrically conductive material in the inner layer 141 in a portion of fuel filler pipe 14 is in electrical communication with electrically conductive material in adapter sleeve 40.

Fuel filler pipe 14 includes a skin 14S comprising a wrapper 14W arranged to wrap around tube 40T of adapter sleeve 40 as suggested in FIG. 4C. Fuel filler pipe 14 also includes at least one protuberance 14P1-3 coupled to wrapper 14W and arranged to extend in a radially inwardly direction toward an interior surface of tube 40T of adapter sleeve 40. Inner layer 141 is appended to a radially inwardly facing surface of wrapper 14W to cause electrically conductive material in inner layer 141 on wrapper 14W to be exposed to and in electrical communication with TURBULENCE-GENERATED static electricity extant in the fuel-conducting passageway 15 and is appended to at least one protuberance 14P1-3 to mate with electrically conductive material in tube 40T of adapter sleeve 40 to transfer TURBULENCE-GENERATED static electricity from the fuel-conducting passageway 15 to the electrically conductive material in inner layer 141 of fuel filler pipe 14 and adapter sleeve 40. The skin 14S of fuel filler pipe 14 also comprises three protuberances 14P1-3 spaced apart about wrapper 14W and arranged to extend from wrapper 14W in radially inward directions to engage tube 40T of adapter sleeve 40 as suggested in FIG. 4C to form an annular gap G between tube 40T of adapter sleeve 40 and a portion of wrapper 14W surrounding tube.

The invention claimed is:

1. A fuel-tank fill tube comprising
    a fuel filler pipe formed to include a fuel-conducting passageway adapted to conduct liquid fuel to a fuel tank,
    a nozzle-insertion housing arranged to extend into the fuel-conducting passageway formed in the fuel filler pipe and formed to include an outer nozzle-receiving aperture opening into a nozzle-receiver channel communicating with the fuel-conducting passageway formed in the fuel filler pipe,
    an outer-aperture stopper arranged proximate to the outer nozzle-receiving aperture of the nozzle-insertion housing, that is electrically conductive and that is mounted for movement relative to the nozzle-insertion housing from a closed position normally closing the outer nozzle-receiving aperture to an opened position opening the outer nozzle-receiving aperture in response to engagement with a tip of a fuel-dispensing pump nozzle moving toward the fuel-conducting passageway formed in the fuel filler pipe, and
    static-electricity discharge means for conducting nozzle-generated static electricity transferred to the outer-aperture stopper by the tip of the fuel-dispensing pump nozzle to an electrically conductive exterior terminal arranged proximate to the outer nozzle-receiving aperture of the nozzle-insertion housing and proximate to a distal end of the fuel filler pipe during movement of the outer-aperture stopper from the closed position to the opened position so that the nozzle-generated static electricity is discharged from the electrically conductive exterior terminal to a ground located in spaced-apart relation to the fuel filler pipe and associated with a vehicle chassis adapted to support the fuel filler pipe.

2. The fuel-tank fill tube of claim 1, wherein the static-electricity discharge means comprises an adapter sleeve made of an electrically conductive material and formed to include a tube configured to surround the nozzle-insertion housing and arranged to lie in an annular space provided between an exterior surface of the nozzle-insertion housing and an interior surface of the fuel filler pipe and the adapter sleeve further includes a radially outwardly extending first flange appended to the tube and configured to provide the electrically conductive exterior terminal at a distal end thereof.

3. The fuel-tank fill tube of claim 2, wherein the static-electricity discharge means further includes a radially outwardly extending second flange appended to the tube to lie in spaced-apart relation to the radially outwardly extending first flange and arranged to cause a distal end of the radially outwardly extending second flange to lie in spaced-apart relation to the interior surface of the fuel filler pipe to form an annular gap therebetween and the static-electricity discharge means further includes an O-ring seal positioned to lie in a seal-receiver space formed between the radially outwardly extending first and second flanges to cause the O-ring seal to sealingly engage each of the tube and the fuel filler pipe.

4. The fuel-tank fill tube of claim 3, wherein the fuel filler pipe comprises an ethyl-vinyl-alcohol permeation barrier layer formed to include a frusto-conical distal end arranged to lie in mating engagement with a portion of the O-ring seal included in the static-electricity discharge means.

5. The fuel-tank fill tube of claim 3, wherein the fuel filler pipe comprises an outer layer made of plastics material and arranged to engage the radially outwardly extending first flange and provide a radially outwardly facing exterior surface of the fuel filler pipe, the fuel filler pipe further comprises an ethyl-vinyl-alcohol permeation barrier layer arranged to mate with a radially inwardly facing surface of the outer layer, and wherein distal end portions of each of the outer and ethyl-vinyl-alcohol permeation barrier layers cooperate to form a frusto-conical surface that lies in mating engagement with a portion of the O-ring seal included in the static-electricity discharge means.

6. The fuel-tank fill tube of claim 5, wherein the fuel filler pipe further includes an inner layer made of electrically conductive material and arranged to surround portions of the tube of the adapter sleeve, the ethyl-vinyl-alcohol permeation barrier is interposed between the inner and outer layers, and the inner layer includes a frusto-conical distal end arranged to lie in mating engagement with a portion of the O-ring seal included in the static-electricity discharge means.

7. The fuel-tank fill tube of claim 5, wherein the distal end portion of the outer layer of the fuel filler pipe further includes an annular end surface that is arranged to lie in mating engagement with an axially inwardly facing side surface of the radially outwardly extending first flange of the adapter sleeve and the nozzle-insertion housing includes a radially outwardly extending annular flange that is arranged to lie in mating engagement with an axially outwardly facing side surface of the radially outwardly extending first flange of the adapter sleeve to trap the radially outwardly extending first flange of the adapter sleeve between the radially outwardly extending annular flange of the nozzle-insertion housing and the outer layer of the fuel filler pipe.

8. The fuel-tank fill tube of claim 2, wherein the static-electricity discharge means includes an O-ring seal arranged to lie in sealing engagement with each of the tube of the adapter sleeve and the fuel filler pipe, the fuel filler pipe includes a radially outwardly facing outer layer, a radially inwardly facing inner layer, and an ethyl-vinyl-alcohol permeation barrier layer interposed between the radially outwardly facing outer layer and the radially inwardly facing inner layer, and the ethyl-vinyl-alcohol permeation barrier layer has a frusto-conical end surface that lies in mating engagement with a portion of the O-ring seal in the static-electricity discharge means.

9. The fuel-tank fill tube of claim 8, wherein the radially outwardly facing outer layer of the fuel filler pipe includes an annular end surface arranged to mate with the radially outwardly extending first flange of the adapter sleeve and a frusto-conical end surface arranged to lie alongside the frusto-conical end surface of the ethyl-vinyl-alcohol permeation barrier layer mate with a portion of the O-ring seal of the static-electricity discharge means.

10. The fuel-tank fill tube of claim 2, wherein the outer-aperture stopper comprises electrically conductive material that contacts electrically conductive material in the tube of the adapter sleeve to cause static electricity discharged from the outer-aperture stopper to transfer to the electrically conductive exterior terminal included in the radially outwardly extending first flange via the tube of the adapter sleeve.

11. The fuel-tank fill tube of claim 10, wherein the static-electricity discharge means further includes an outer housing-retainer ring arranged to retain the nozzle-insertion housing in a stationary position relative to the fuel filler pipe to trap the electrically conductive exterior terminal of the adapter sleeve in a fixed position between portions of each of the fuel filler tube and the nozzle-insertion housing and wherein the outer housing-retainer ring includes electrically conductive material positioned to lie in electrical communication with electrically conductive material included in the electrically conductive exterior terminal of the adapter sleeve for distribution to the electrically conductive exterior terminal of the adapter sleeve.

12. The fuel tank fill tube of claim 11, further comprising an electrically conductive grounding wire coupled to electrically conductive material in the outer housing-retainer ring and adapted to be coupled electrically to a ground associated with a vehicle chassis configured to support the fuel filler tube.

13. The fuel-tank fill tube of claim 10, wherein the outer-aperture stopper includes an outer flapper door mounted on the nozzle-insertion housing for pivotable movement about an outer pivot axis between an opened position opening the outer nozzle-receiving aperture and a closed position closing the outer nozzle-receiving aperture and an outer spring arranged to contact electrically conductive material in the tube of the adapter sleeve and to engage the outer flapper door normally and yieldably to pivot the outer flapper door about the outer pivot axis to assume the closed position, and wherein the outer flapper door and the outer spring each comprise electrical conductive material to transfer static electricity discharged onto the outer flapper door during engagement of a tip of the fuel-dispensing pump nozzle and the outer flapper door to electrically conductive material in the tube of the adapter sleeve for distribution to the electrically conductive exterior terminal of the adapter sleeve.

14. The fuel-tank fill tube of claim 13, wherein the outer spring is located in an interior region formed in the nozzle-insertion housing and is arranged to extend through a spring-passage channel formed in the nozzle-insertion housing to reach and contact electrically conductive material in the tube of the adapter sleeve that is arranged to extend around an exterior surface of the nozzle-insertion housing.

15. The fuel-tank fill tube of claim 14, wherein the nozzle-insertion housing includes a frame formed to include the nozzle-receiving channel and the outer nozzle-receiving aperture opening into the nozzle-receiving channel, the outer flapper door is mounted on the frame for pivotable movement about the outer pivot axis and is located in the nozzle-receiving channel, the nozzle-insertion housing further includes a lower O-ring seal coupled to the frame and arranged to extend radially outwardly to engage a radially inwardly facing interior surface of the tube of the adapter sleeve and an upper O-ring seal coupled to the frame and arranged to extend radially outwardly to engage the radially inwardly facing interior surface of the tube of the adapter sleeve, and the spring-passage channel is located between the lower and upper O-ring seals.

16. The fuel-tank fill tube of claim 1, wherein the nozzle-insertion housing includes a frame formed to include the nozzle-receiving channel and the outer nozzle-receiving aperture opening into the nozzle-receiving channel, the outer-aperture stopper includes an outer flapper door mounted on the frame for pivotable movement about an outer pivot axis between an opened position opening the outer nozzle-receiving aperture and a closed position closing the outer nozzle-receiving aperture and a door-biasing spring arranged to contact the outer flapper door normally to yieldably urge the outer flapper door to the closed position, the static-electricity discharge means comprises an adapter sleeve made of an electrically conductive material and configured to provide the electrically conductive exterior terminal, and the door-biasing spring is arranged to extend from the nozzle-receiving channel through a spring-passage channel formed in the frame of the nozzle-insertion housing to cause electrically conductive material in the door-biasing spring to contact electrically conductive material in the adapter sleeve when electrically conductive material in the outer flapper door in electrical communication with electrically conductive material in the door-biasing spring is engaged by the tip of the fuel-dispensing pump nozzle to allow transfer of static electricity from the outer flapper door to the electrically conductive exterior terminal in the adapter sleeve via electrically conductive material in the door-biasing spring.

17. The fuel-tank fill tube of claim 16, wherein the door-biasing spring comprises a first leg contacting electrically conductive material in the outer flapper door and a second leg contacting electrically conductive material in the adapter sleeve when the outer flapper door is in the opened and closed positions.

18. The fuel-tank fill tube of claim 16, wherein the static-electricity means further includes an outer housing-retainer ring engaged to the fuel filler pipe and the nozzle-insertion housing to retain the nozzle-insertion housing in a stationary position extending into the fuel-conducting passageway formed in the fuel filler pipe and the outer housing-retainer ring includes electrically conductive material positioned to lie in electrical communication with electrically conductive material included in the electrically conductive exterior terminal.

19. The fuel-tank fill tube of claim 18, wherein an outer end of the fuel filler pipe terminates at an annular outer surface, the nozzle-insertion housing includes a mount flange having an annular inner surface facing toward the annular outer surface of the outer end of the fuel filler pipe, the electrically conductive exterior terminal is interposed between the annular outer and inner surfaces and includes a radially outwardly facing outer edge in engagement with a radially inwardly facing surface of the outer housing-retainer ring.

20. The fuel-tank fill tube of claim 19, wherein the fuel filler pipe includes a tubular member including the annular outer surface and a nozzle-shaped member arranged to lie in spaced-apart relation to the mount flange of the nozzle-insertion housing to locate the tubular member therebetween and the outer housing-retainer ring includes a cylindrical band arranged to surround the tubular member, electrically conductive exterior terminal, and mount flange, a radially inwardly turned lip coupled to an inner end of the cylindrical band and arranged to mate with an exterior surface of the nozzle-shaped member of the fuel filler pipe, and a radially inwardly turned outer lip coupled to an outer end of the cylindrical band and arrange to mate with the mount flange to retain the nozzle-insertion housing in the stationary position extending into the fuel-conducting passageway.

21. The fuel-tank fill tube of claim 20, wherein the static-electricity discharge means further comprises an adapter sleeve made of an electrically conductive material and the adapter sleeve includes a tube arranged to surround the nozzle-insertion housing and a radially outwardly extending first flange coupled to the tube and configured to provide the electrically conductive exterior terminal at a distal end thereof.

22. The fuel-tank fill tube made of claim 21, wherein the tubular member of the fuel filler pipe is interposed between the tube of the adapter sleeve and the cylindrical band of the outer housing-retainer ring.

23. The fuel-tank fill tube of claim 22, wherein the static-electricity discharge means further includes an O-ring seal positioned to lie in sealing engagement with each of the tubular member of the fuel filler pipe and the tube of the adapter sleeve.

24. The fuel-tank fill tube of claim 23, wherein the electrically conductive exterior terminal includes a radially outwardly facing surface and several radially outwardly extending crush ribs cantilevered to the radially outwardly facing surface of the electrically conductive exterior terminal to extend into the electrically conductive material in the cylindrical band of the outer housing-retainer ring to ensure electrical communication between the adapter sleeve and the outer housing-retainer ring.

25. The fuel-tank fill tube of claim 1, wherein the fuel filler pipe includes static-electricity transfer means for conducting turbulence-generated static electricity extant in the fuel filler pipe owing to discharge of liquid fuel from the fuel-dispensing pump nozzle into the fuel-conducting passageway formed in the fuel filler pipe during a fuel-tank refueling activity to the static-electricity discharge means so that the turbulence-generated static electricity is conducted to the electrically conductive exterior terminal for distribution to the ground associated with the vehicle chassis and wherein the static-electricity transfer means comprises an inner layer of the fuel filler pipe made of electrically conductive material exposed to liquid fuel flowing in the fuel-conducting passageway of the fuel filler pipe.

26. The fuel-tank of claim 25, herein the static-electricity discharge means comprises an adapter sleeve made of an electrically conductive material and formed to include a tube configured to surround the nozzle-insertion housing and the electrically conductive material in the inner layer in a portion of the fuel filler pipe is in electrical communication with electrically conductive material in the adapter sleeve.

27. The fuel-tank fill tube of claim 26, wherein the fuel filler pipe includes a skin comprising a wrapper arranged to wrap around the tube of the adapter sleeve and at least one protuberance coupled to the wrapper and arranged to extend in a radially inwardly direction toward an interior surface of the tube of the adapter sleeve and wherein the inner layer is appended to a radially inwardly facing surface of the wrapper to cause electrically conductive material in the inner layer on the wrapper to be exposed to and in electrical communication with turbulence-generated static electricity extant in the fuel-conducting passageway and is appended to at least one protuberance to mate with electrically conductive material in the tube of the adapter sleeve to transfer turbulence-generated static electricity from the fuel-conducting passageway to the electrically conductive material in the inner layer of the fuel filler pipe and the adapter sleeve.

28. The fuel-tank fill tube of claim 27, wherein the skin of the fuel filler pipe comprises three protuberances spaced apart about the wrapper and arranged to extend from the wrapper in radially inward directions to engage the tube of the adapter sleeve to form an annular gap between the tube of the adapter sleeve and a portion of the wrapper surrounding the tube.

29. The fuel-tank fill tube of claim 1, wherein the nozzle-insertion housing is formed to include an inner nozzle-receiving aperture lying below the outer nozzle-receiving aperture and opening into the nozzle-receiver channel and further comprising an electrically conductive inner-aperture stopper mounted for movement relative to the nozzle-insertion housing from a closed position normally closing the inner nozzle-receiving aperture in response to engagement with the tip of the fuel-dispensing pump nozzle moving in the nozzle-receiver channel toward the fuel-conducting passageway formed in the final filler pipe and wherein the static-electricity discharge means lies in electrical communication with the electrically conductive inner-aperture stopper to conduct nozzle-generated static-electricity transferred to the inner-aperture stopper by the tip of the fuel-dispensing pump nozzle to the electrically conductive exterior terminal for distribution to the ground associated with the vehicle chassis.

30. The fuel-tank fill tube of claim 29, wherein the static-electricity discharge means comprises an adapter sleeve made of an electrically conductive material and formed to include a tube configured to surround the nozzle-insertion housing and arranged to lie in an annular space provided between an exterior surface of the nozzle-insertion housing and an interior surface of the fuel filler pipe and the adapter sleeve further includes a radially outwardly extending first flange appended to the tube and configured to provide the electrically conductive exterior terminal at a distal end thereof.

31. The fuel-tank fill tube of claim 30, wherein the inner-aperture stopper comprises electrically conductive material that contacts electrically conductive material in the tube of the adapter sleeve to cause static electricity discharged from the inner-aperture stopper to transfer to the electrically conductive exterior terminal included in the radially outwardly extending first flange via the tube of the adapter sleeve.

32. The fuel-tank fill tube of claim 30, wherein the inner-aperture stopper includes an inner flapper door mounted on the nozzle-insertion housing for pivotable movement about an inner pivot axis between an opened position opening the inner nozzle-receiving aperture and a closed position closing the inner nozzle-receiving aperture and an inner spring arranged to contact electrically conductive material in the tube of the adapter sleeve and to engage the inner flapper door normally and yieldably to pivot the inner flapper door about the outer pivot axis to assume the closed position, and wherein the inner flapper door and the inner spring each comprise electrical conductive material to transfer static electricity discharged onto the inner flapper door during engagement of a tip of the fuel-dispensing pump nozzle and the inner flapper door to electrically conductive material in the tube of the adapter sleeve for distribution to the electrically conductive exterior terminal of the adapter sleeve.

33. The fuel-tank fill tube of claim 32, wherein the inner spring is located in an interior region formed in the nozzle-insertion housing and is arranged to extend through a spring-passage channel formed in the nozzle-insertion housing to reach and contact electrically conductive material in the tube of the adapter sleeve that is arranged to extend around an exterior surface of the nozzle-insertion housing.

34. The fuel-tank fill tube of claim 29, wherein the static-electricity discharge means comprises an adapter sleeve made of an electrically conductive material and formed to include a tube configured to surround the nozzle-insertion housing and arranged to lie in an annular space provided between an exterior surface of the nozzle-insertion housing and an interior surface of the fuel filler pipe and the adapter sleeve further includes a radially outwardly extending first flange appended to the tube and configured to provide the electrically conductive exterior terminal at a distal end thereof.

35. The fuel-tank fill tube of claim 34, wherein the inner-aperture stopper comprises electrically conductive material that contacts electrically conductive material in the tube of the adapter sleeve to cause static electricity discharged from the inner-aperture stopper to transfer to the electrically conductive exterior terminal included in the radially outwardly extending first flange via the tube of the adapter sleeve.

36. The fuel-tank fill tube of claim 35, wherein the static-electricity discharge means further includes an outer housing-retainer ring arranged to retain the nozzle-insertion housing in a stationary position relative to the fuel filler pipe to trap the electrically conductive exterior terminal of the adapter sleeve in a fixed position between portions of each of the fuel filler tube and the nozzle-insertion housing and wherein the outer housing-retainer ring includes electrically conductive material positioned to lie in electrical communication with electrically conductive material included in the electrically conductive exterior terminal of the adapter sleeve for distribution to the electrically conductive exterior terminal of the adapter sleeve.

37. The fuel tank fill tube of claim 36, further comprising an electrically conductive grounding wire coupled to electrically conductive material in the outer housing-retainer ring and adapted to be coupled electrically to a ground associated with a vehicle chassis configured to support the fuel filler tube.

38. The fuel-tank fill tube of claim 35, wherein the inner-aperture stopper includes an inner flapper door mounted on the nozzle-insertion housing for pivotable movement about an inner pivot axis between an opened position opening the inner nozzle-receiving aperture and a closed position closing the inner nozzle-receiving aperture and an inner spring arranged to contact electrically conductive material in the tube of the adapter sleeve and to engage the inner flapper door normally and yieldably to pivot the inner flapper door about the outer pivot axis to assume the closed position, and wherein the inner flapper door and the inner spring each comprise electrical conductive material to transfer static electricity discharged onto the inner flapper door during engagement of a tip of the fuel-dispensing pump nozzle and the inner flapper door to electrically conductive material in the tube of the adapter sleeve for distribution to the electrically conductive exterior terminal of the adapter sleeve.

39. The fuel-tank fill tube of claim 38, wherein the inner spring is located in an interior region formed in the nozzle-insertion housing and is arranged to extend through a spring-passage channel formed in the nozzle-insertion housing to reach and contact electrically conductive material in the tube of the adapter sleeve that is arranged to extend around an exterior surface of the nozzle-insertion housing.

40. The fuel-tank fill tube of claim 39, wherein the nozzle-insertion housing includes a frame formed to include the nozzle-receiving channel and the inner nozzle-receiving aperture opening into the nozzle-receiving channel, the inner flapper door is mounted on the frame for pivotable movement about the inner pivot axis and is located in the nozzle-receiving channel, the nozzle-insertion housing further includes a lower O-ring seal coupled to the frame and arranged to extend radially outwardly to engage a radially inwardly facing interior surface of the tube of the adapter sleeve and an upper O-ring seal coupled to the frame and arranged to extend radially outwardly to engage the radially inwardly facing interior surface of the tube of the adapter sleeve, and the spring-passage channel is located between the lower and upper O-ring seals.

41. The fuel-tank fill tube of claim 38, wherein the inner spring comprises a first leg contacting electrically conductive material in the inner flapper door and a second leg contacting electrically conductive material in the adapter sleeve when the inner flapper door is in the opened and closed positions.

42. A fuel-tank fill tube comprising
a fuel filler pipe formed to include a fuel-conducting passageway adapted to conduct liquid fuel to a fuel tank,
a nozzle-insertion housing arranged to extend into the fuel-conducting passageway formed in the fuel filler pipe and formed to include in sequence an outer nozzle-receiving aperture opening into a nozzle-receiver channel and inner nozzle-receiving aperture underlying the outer nozzle-receiving aperture and communicating with the fuel-conducting passageway formed in the fuel filler pipe,
an inner-aperture stopper arranged inwardly of the outer nozzle-receiving aperture of the nozzle-insertion housing, that is electrically conductive, and that is mounted for movement relative to the nozzle-insertion housing from a closed position normally closing the inner nozzle-receiving aperture to an opened position opening the inner nozzle-receiving aperture in response to engagement with a tip of a fuel-dispensing pump nozzle moving toward the fuel-conducting passageway formed in the fuel filler pipe, and
static-electricity discharge means for conducting nozzle-generated static electricity transferred to the inner-aperture stopper by the tip of the fuel-dispensing pump nozzle to an electrically conductive exterior terminal arranged proximate to the outer nozzle-receiving aperture of the nozzle-insertion housing and proximate to a distal end of the fuel filler pipe during movement of the inner-aperture stopper from the closed position to the opened position so that the nozzle-generated static electricity is discharged from the electrically conductive exterior terminal to a ground located in spaced-apart relation to the fuel filler pipe and associated with a vehicle chassis adapted to support the fuel filler pipe.

43. A fuel-tank fill tube comprising
a fuel filler pipe formed to include a fuel-conducting passageway adapted to conduct liquid fuel to a fuel tank,
a nozzle-insertion housing arranged to extend into the fuel-conducting passageway formed in the fuel filler pipe and formed to include an outer nozzle-receiving aperture opening into a nozzle-receiver channel communicating with the fuel-conducting passageway formed in the fuel filler pipe, and
static-electricity discharge means for conducting turbulence-generated static electricity extant in the fuel filler pipe owing to discharge of liquid fuel from the fuel-dispensing pump nozzle into the fuel-conducting passageway formed in the fuel filler pipe during a tank-refueling activity to an electrically conductive terminal of the fuel filler pipe so that turbulence-generated static electricity is discharged from the electrically conductive exterior terminal to a ground located in spaced-apart relation to the fuel filler pipe associated with a vehicle chassis adapted to support the fuel filler tube,
wherein the static-electricity discharge means comprises an adapter sleeve made of an electrically conductive material and formed to include a tube configured to surround the nozzle-insertion housing and arranged to lie in an annular space provided between an exterior surface of the nozzle-insertion housing and an interior surface of the fuel filler pipe and the adapter sleeve further includes a radially outwardly extending first flange appended to the tube and configured to provide the electrically conductive exterior terminal at a distal end thereof.

44. The fuel-tank fill tube of claim 43, wherein the static-electricity discharge means comprises an inner layer of the fuel filler pipe made of electrically conductive material exposed to liquid fuel flowing in the fuel-conducting passageway of the fuel filler pipe and the inner layer is coupled in electrical communication to the tube of the adapter sleeve.

45. The fuel-tank fill tube of claim 44, wherein the fuel filler pipe includes a skin comprising a wrapper arranged to wrap around the tube of the adapter sleeve and at least one protuberance coupled to the wrapper and arranged to extend in a radially inwardly direction toward an interior surface of the tube of the adapter sleeve and wherein the inner layer is appended to a radially inwardly facing surface of the wrapper to cause electrically conductive material in the inner layer on the wrapper to be exposed to and in electrical communication with turbulence-generated static electricity extant in the fuel-conducting passageway and is appended to at least one protuberance to mate with electrically conductive material in the tube of the adapter sleeve to transfer turbulence-generated static electricity from the fuel-conducting passageway to the electrically conductive material in the inner layer of the fuel filler pipe and the adapter sleeve.

46. The fuel-tank fill tube of claim 44, wherein the skin of the fuel filler pipe comprises three protuberances spaced apart about the wrapper and arranged to extend from the wrapper in radially inward directions to engage the tube of the adapter sleeve to form an annular gap between the tube of the adapter sleeve and a portion of the wrapper surrounding the tube.

* * * * *